(12) United States Patent
Liu et al.

(10) Patent No.: US 10,836,395 B2
(45) Date of Patent: Nov. 17, 2020

(54) EFFICIENT OPTIMAL CONTROL WITH DYNAMIC MODEL FOR AUTONOMOUS VEHICLE

(71) Applicant: Great Wall Motor Company Limited, Baoding (CN)

(72) Inventors: Zhichao Liu, Novi, MI (US); Kai Zhang, Carmel, IN (US); Duong Le, Westland, MI (US)

(73) Assignee: Great Wall Motor Company Limited, Baoding (CN)

( * ) Notice: Subject to any disclaimer, the term of this patent is extended or adjusted under 35 U.S.C. 154(b) by 56 days.

(21) Appl. No.: 16/230,111

(22) Filed: Dec. 21, 2018

(65) Prior Publication Data

US 2020/0156639 A1    May 21, 2020

Related U.S. Application Data

(60) Provisional application No. 62/768,431, filed on Nov. 16, 2018.

(51) Int. Cl.
| | | |
|---|---|---|
| *B60W 30/182* | (2020.01) | |
| *G05D 1/00* | (2006.01) | |
| *G05D 1/02* | (2020.01) | |
| *B60W 40/105* | (2012.01) | |

(52) U.S. Cl.
CPC ........ *B60W 30/182* (2013.01); *B60W 40/105* (2013.01); *G05D 1/0088* (2013.01); *G05D 1/0221* (2013.01); *B60W 2520/06* (2013.01); *B60W 2520/10* (2013.01); *B60W 2540/18* (2013.01); *G05D 2201/0213* (2013.01)

(58) Field of Classification Search
CPC ............. B60W 30/182; B60W 40/105; B60W 2520/06; B60W 2520/10; B60W 2540/18; G05D 1/0221; G05D 1/0088; G05D 2201/0213
USPC .......................................................... 701/23
See application file for complete search history.

(56) References Cited

U.S. PATENT DOCUMENTS

| | | | |
|---|---|---|---|
| 8,965,691 B1 * | 2/2015 | Lombrozo | ............ B60W 40/10 701/498 |
| 9,566,986 B1 | 2/2017 | Gordon et al. | |
| 2005/0134443 A1 * | 6/2005 | Hottebart | ............... G01D 7/002 340/442 |
| 2009/0195376 A1 * | 8/2009 | Miller | ................... B60R 25/241 340/457.1 |

(Continued)

*Primary Examiner* — Muhammad Shafi
(74) *Attorney, Agent, or Firm* — Young Basile Hanlon & MacFarlane, P.C.

(57) ABSTRACT

Disclosed herein are methods and systems for efficient optimal control with dynamic modeling for an autonomous vehicle (AV). The method may include acquiring vehicle status information for the AV, determining a longitudinal velocity of the AV, determining a driving style factor, wherein the driving style factor is dependent on at least road scenarios, obtaining an optimal control factor from a look-up table (LUT) using the determined longitudinal velocity and the determined driving style factor and providing an updated control command (such as a steering command) based on the obtained optimal control factor. The driving style factor may be determined from at least vehicle status, desired trajectory, current linear velocity and like parameters and ranges between a gentle driving mode and an aggressive driving mode.

20 Claims, 20 Drawing Sheets

(56) References Cited

U.S. PATENT DOCUMENTS

2017/0228662 A1\* 8/2017 Gu .................. G06N 3/0427
2017/0305374 A1\* 10/2017 Hong ................ B60R 21/0132

\* cited by examiner

| Driving style factor 'α' / Velocity | α=0 | α=0.1 | α=0.2 | α=0.3 | α=0.4 | α=0.5 | α=0.6 | α=0.7 | α=0.8 | α=0.9 | α=1.0 |
|---|---|---|---|---|---|---|---|---|---|---|---|
| < 5 mph | ... | ... | ... | ... | ... | ... | ... | ... | ... | ... | ... |
| 5-10 mph | ... | ... | ... | ... | ... | ... | ... | ... | ... | ... | ... |
| 11-15 mph | ... | ... | ... | ... | ... | ... | ... | ... | ... | ... | ... |
| 16-20 mph | ... | ... | ... | ... | ... | ... | ... | ... | ... | ... | ... |
| 21-25 mph | ... | ... | ... | ... | ... | ... | ... | ... | ... | ... | ... |
| 26-30 mph | ... | ... | ... | ... | ... | ... | ... | ... | ... | ... | ... |
| 31-35 mph | ... | ... | ... | ... | ... | ... | ... | ... | ... | ... | ... |
| 36-40 mph | ... | ... | ... | ... | ... | ... | ... | ... | ... | ... | ... |
| 41-45 mph | ... | ... | ... | ... | ... | ... | ... | ... | ... | ... | ... |
| 46-50 mph | ... | ... | ... | ... | ... | ... | ... | ... | ... | ... | ... |
| 51-55 mph | ... | ... | ... | ... | ... | ... | ... | ... | ... | ... | ... |
| 56-60 mph | ... | ... | ... | ... | ... | ... | ... | ... | ... | ... | ... |
| 61-65 mph | ... | ... | ... | ... | ... | ... | ... | ... | ... | ... | ... |
| 66-70 mph | ... | ... | ... | ... | ... | ... | ... | ... | ... | ... | ... |
| 71-75 mph | ... | ... | ... | ... | ... | ... | ... | ... | ... | ... | ... |
| 76-80 mph | ... | ... | ... | ... | ... | ... | ... | ... | ... | ... | ... |
| >80 mph | ... | ... | ... | ... | ... | ... | ... | ... | ... | ... | ... |

FIG. 9

|  | Gentle $a=0$ | Moderate $a=0.5$ | Aggressive $a=1$ |
|---|---|---|---|
| Vx = 10 mph | 9 s<br>-122 – -24 deg | 6 s<br>-210 – -50 deg | 4.5 s<br>-310 – -115 deg |
| Vx = 30 mph | 4.5 s<br>-90 – -18 deg | 4 s<br>-130 – -35 deg | 4.5 s (vibration)<br>-180 – -225 deg |
| Vx = 50 mph | 4 s<br>-78 – -15 deg | 3.5 s<br>-110 – -80 deg | unstable |

FIG. 11

EFFICIENT OPTIMAL CONTROL WITH DYNAMIC MODEL FOR AUTONOMOUS VEHICLE

CROSS-REFERENCE TO RELATED APPLICATION

This application claims priority to and the benefit of U.S. Provisional Application Patent Ser. No. 62/768,431, filed Nov. 16, 2018, the entire disclosure of which is hereby incorporated by reference.

TECHNICAL FIELD

This disclosure relates to autonomous vehicles. More specifically, this disclosure relates to efficient optimal control with dynamic modeling for autonomous vehicles.

SUMMARY

Disclosed herein are methods and systems for efficient optimal control with dynamic modeling for an autonomous vehicle (AV). The method may include acquiring vehicle status information for the AV, determining a longitudinal velocity of the AV, determining a driving style factor, wherein the driving style factor is dependent on at least road scenarios, obtaining an optimal control factor from a look-up table (LUT) using the determined longitudinal velocity and the determined driving style factor and providing an updated control command (such as a steering command) based on the obtained optimal control factor. The driving style factor may be determined from at least vehicle status, desired trajectory, current linear velocity and like parameters and ranges between a gentle driving mode and an aggressive driving mode.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

FIG. 9 is a block diagram of a look-up table (LUT) in accordance with embodiments of this disclosure.

FIG. 11 is a table of example vehicle response time and operating range of steering wheel angle when a driving style factor is used in accordance with embodiments of this disclosure.

DETAILED DESCRIPTION

Figure 1:
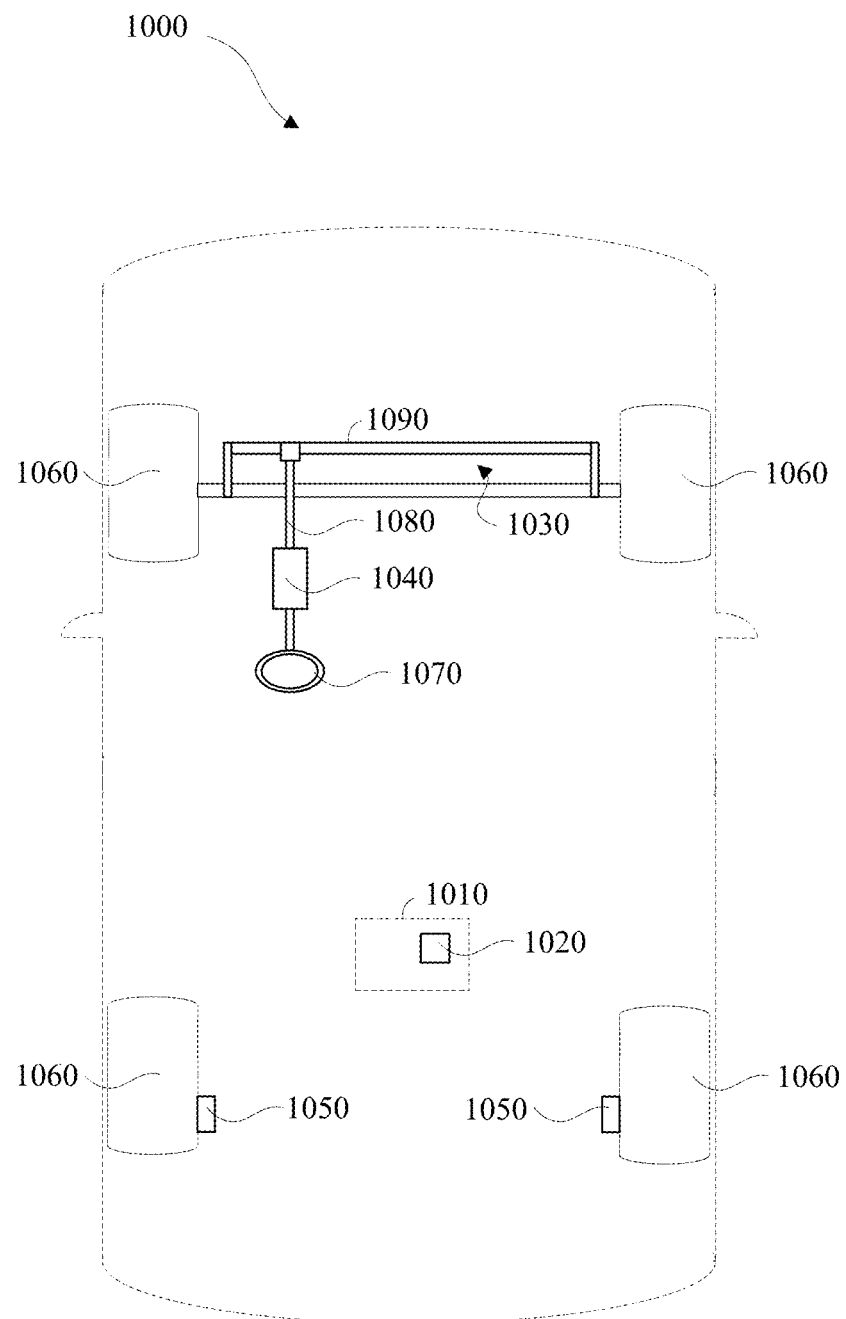
FIG. 1 is a diagram of an example of a vehicle in accordance with embodiments of this disclosure.

Reference will now be made in greater detail to a preferred embodiment of the invention, an example of which is illustrated in the accompanying drawings. Wherever possible, the same reference numerals will be used throughout the drawings and the description to refer to the same or like parts.

As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "determine" and "identify," or any variations thereof, includes selecting, ascertaining, computing, looking up, receiving, determining, establishing, obtaining, or otherwise identifying or determining in any manner whatsoever using one or more of the devices and methods shown and described herein.

As used herein, the terminology "example," "embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Autonomous vehicles use controllers or motion controllers to track the desired trajectory quickly and with little tracking error. The optimal controllers and associated methods, i.e. linear quadratic regulator (LQR), linear quadratic Gaussian (LQG) control, and model predictive control (MPC), are the common methods used to get an optimal solution that minimizes the tracking error and input consumption. However, there are still problems which need to be resolved.

Figure 6:
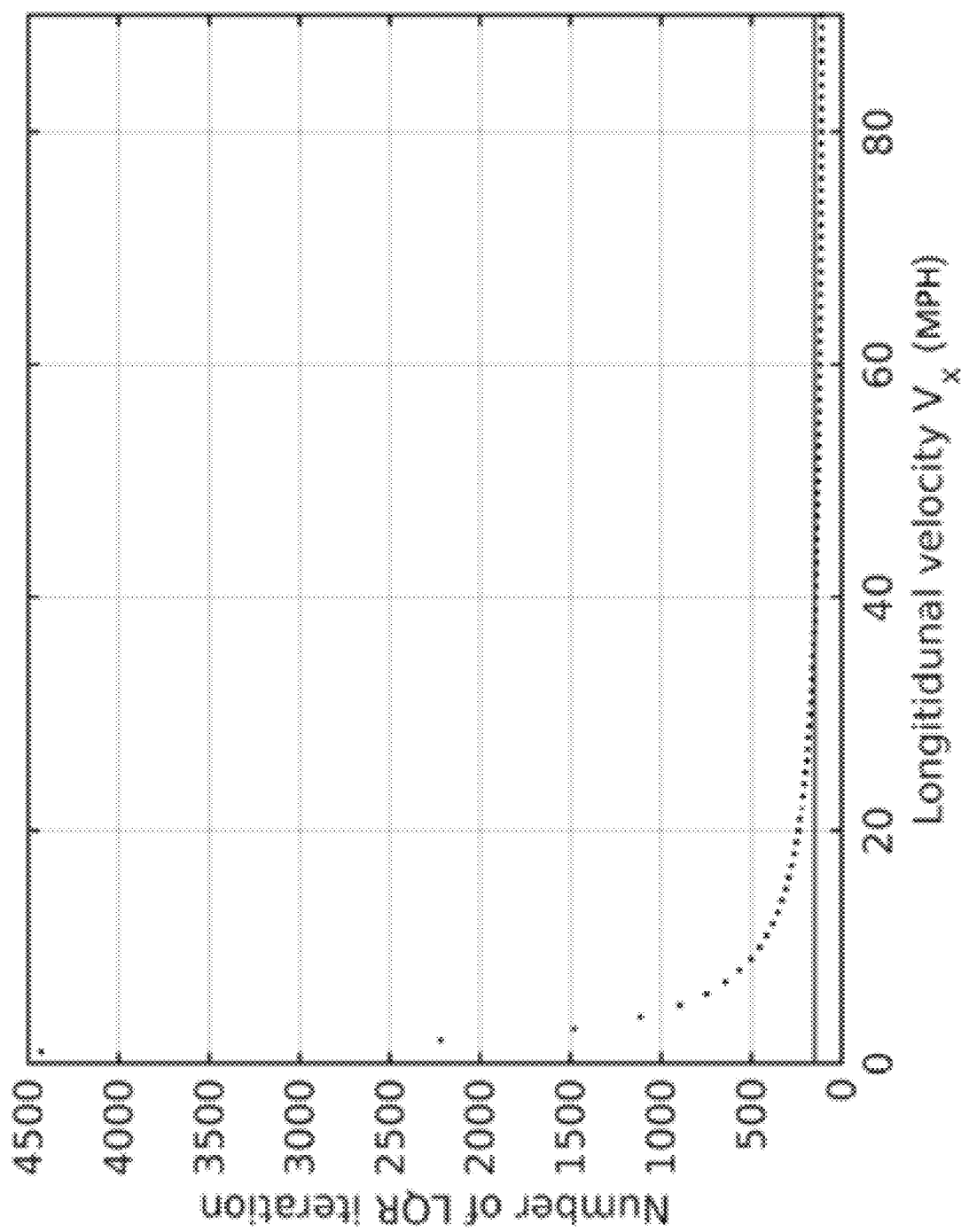
FIG. 6 is a graph of an example of failing to resolve a solution within a certain number of linear quadratic regulator (LQR) iterations.

First, the optimal controllers need to solve a complex optimization problem to obtain a system input. Because of the dynamic modeling properties of a vehicle, the optimal controllers need to update a solution every control cycle. For example, the LQR and LQG controllers need to resolve algebraic Riccati equations in every control cycle based on the dynamic vehicle model. FIG. 6 shows an example of the number of iterations needed by an LQR controller, for example, for different longitudinal velocities. Dynamic programming methods are applied to solve the algebraic Riccati equation. To ensure the resolving process can be finished within one controller time interval or cycle (e.g., 0.01 seconds), the Riccati equation solver sets the iteration limit as 150 iterations. However, as shown in FIG. 6, the Riccati equation solver cannot derive a solution within the iteration limit at low speeds. For the LQG controller, the Riccati equation solver is the same as the one for the LQR controller. For the MPC controller, the quadratic programming solver has similar problems.

Second, the optimal controller needs to consider the trade-off between converge speed and stability. Quick converge speed will result in the vehicle having a fast response time and quick tracking of the desired trajectory, but the vehicle will also have a higher possibility of oversteering and instability.

An autonomous vehicle includes an object detection system, a navigation system, and a control system. The object detection system is configured to determine whether other vehicles or objects like pedestrians and cyclists will intersect the travel path of the host vehicle. The navigation system is configured to determine a travel path for the host vehicle. The control system is configured to communicate with the object detection system and the navigation system to operate a steering/acceleration profile for the host vehicle that avoids the potential collisions with other vehicles or objects. The control systems described herein use optimal controller methods which incorporate a driving style factor in the cost function weighing matrices. For example, the controller systems may use an LQG controller, an LQR controller, an MPC controller or the like. The driving style factor may be adjusted under different road scenarios, to balance the trade-off between converge speed and stability. The optimal controller methods also use a look-up table (LUT) to accelerate the calculation process. The LUT may be populated offline for combinations of speed range and driving style factors. This simplifies the solution determining process and guarantees a better stability solution.

FIG. 1 is a diagram of an example of a vehicle 1000 in accordance with embodiments of this disclosure. The vehicle 1000 may be an autonomous vehicle (AV) or a semi-autonomous vehicle. As shown in FIG. 1, the vehicle 1000 includes a control system 1010. The control system 1010 may be referred to as a controller. The control system 1010 includes a processor 1020. The processor 1020 is programmed to command application of one of up to a predetermined steering torque value and up to a predetermined net asymmetric braking force value. Each predetermined force is selected to achieve a predetermined vehicle yaw torque that is at most the lesser of a first maximum yaw torque resulting from actuating a steering system 1030 and a second maximum yaw torque resulting from actuating a brake system.

The steering system 1030 may include a steering actuator 1040 that is an electric power-assisted steering actuator. The brake system may include one or more brakes 1050 coupled to respective wheels 1060 of the vehicle 1000. Additionally, the processor 1020 may be programmed to command the brake system to apply a net asymmetric braking force by each brake 1050 applying a different braking force than the other brakes 1050.

The processor 1020 may be further programmed to command the brake system to apply a braking force, for example, a net asymmetric braking force, in response to a failure of the steering system 1030. Additionally or alternatively, the processor 1020 may be programmed to provide a warning to an occupant in response to the failure of the steering system 1030. The steering system 1030 may be a power-steering control module. The control system 1010 may include the steering system 1030. Additionally, the control system 1010 may include the brake system.

The steering system 1030 may include a steering actuator 1040 that is an electric power-assisted steering actuator. The brake system may include two brakes 1050 coupled to respective wheels 1060 on opposite sides of the vehicle 1000. Additionally, the method may include commanding the brake system to apply a net asymmetric braking force by each brake 1050 applying a different braking force.

The control system 1010 allows one of the steering system 1030 and the brake system to take over for the other of the steering system 1030 and the brake system if the other fails while the vehicle 1000 is executing a turn. Whichever of the steering system 1030 and the braking system remains operable is then able to apply sufficient yaw torque to the vehicle 1000 to continue the turn. The vehicle 1000 is, therefore, less likely to impact an object such as another vehicle or a roadway barrier, and any occupants of the vehicle 1000 are less likely to be injured.

The vehicle 1000 may operate in one or more of the levels of autonomous vehicle operation. For purposes of this disclosure, an autonomous mode is defined as one in which each of propulsion (e.g., via a powertrain including an electric motor and/or an internal combustion engine), braking, and steering of the vehicle 1000 are controlled by the processor 1020; in a semi-autonomous mode the processor 1020 controls one or two of the propulsion, braking, and steering of the vehicle 1000. Thus, in one example, non-autonomous modes of operation may refer to SAE levels 0-1, partially autonomous or semi-autonomous modes of operation may refer to SAE levels 2-3, and fully autonomous modes of operation may refer to SAE levels 4-5.

Figure 2:
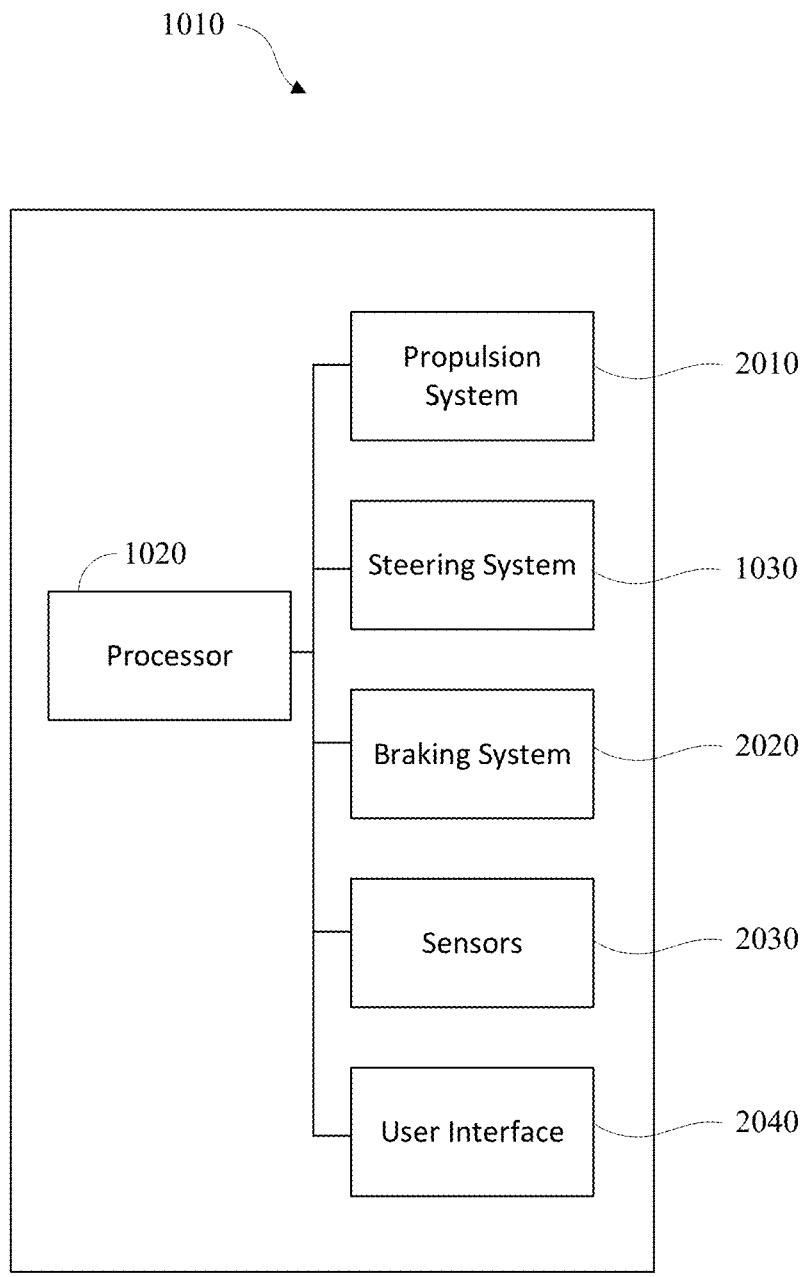
FIG. 2 is a diagram of an example of the control system shown in FIG. 1.

With reference to FIG. 2, the control system 1010 includes the processor 1020. The processor 1020 is included in the vehicle 1000 for carrying out various operations, including as described herein. The processor 1020 is a computing device that generally includes a processor and a memory, the memory including one or more forms of computer-readable media, and storing instructions executable by the processor for performing various operations, including as disclosed herein. The memory of the processor 1020 further generally stores remote data received via various communications mechanisms; e.g., the processor 1020 is generally configured for communications on a communications network within the vehicle 1000. The processor 1020 may also have a connection to an onboard diagnostics connector (OBD-II). Although one processor 1020 is shown in FIG. 2 for ease of illustration, it is to be understood that the processor 1020 could include, and various operations described herein could be carried out by, one or more computing devices. The processor 1020 may be a control module, for example, a power-steering control module, or may include a control module among other computing devices.

The control system 1010 may transmit signals through the communications network, which may be a controller area network (CAN) bus, Ethernet, Local Interconnect Network (LIN), Bluetooth, and/or by any other wired or wireless communications network. The processor 1020 may be in communication with a propulsion system 2010, the steering system 1030, the brake system 2020, sensors 2030, and/or a user interface 2040, among other components.

With continued reference to FIG. 2, the propulsion system 2010 of the vehicle 1000 generates energy and translates the energy into motion of the vehicle 1000. The propulsion system 2010 may be a known vehicle propulsion subsystem, for example, a conventional powertrain including an internal-combustion engine coupled to a transmission that transfers rotational motion to road wheels 1060; an electric powertrain including batteries, an electric motor, and a transmission that transfers rotational motion to the road wheels 1060; a hybrid powertrain including elements of the conventional powertrain and the electric powertrain; or any other type of propulsion. The propulsion system 2010 is in communication with and receives input from the processor 1020 and from a human driver. The human driver may control the propulsion system 2010 via, e.g., an accelerator pedal and/or a gear-shift lever (not shown).

With reference to FIGS. 1 and 2, the steering system 1030 is typically a known vehicle steering subsystem and controls the turning of the road wheels 1060. The steering system 1030 is in communication with and receives input from a steering wheel 1070 and the processor 1020. The steering system 1030 may be a rack-and-pinion system with electric power-assisted steering via a steering actuator 1040, a steer-by-wire system, as are both known in the art, or any other suitable system. The steering system 1030 may include the steering wheel 1070 fixed to a steering column 1080 coupled to a steering rack 1090.

With reference to FIG. 1, the steering rack 1090 is turnably coupled to the road wheels 1060, for example, in a four-bar linkage. Translational motion of the steering rack 1090 results in turning of the road wheels 1060. The steering column 1080 may be coupled to the steering rack 1090 via a rack-and-pinion, that is, gear meshing between a pinion gear and a rack gear (not shown).

The steering column 1080 transfers rotation of the steering wheel 1070 to movement of the steering rack 1090. The steering column 1080 may be, e.g., a shaft connecting the steering wheel 1070 to the steering rack 1090. The steering column 1080 may house a torsion sensor and a clutch (not shown).

The steering wheel 1070 allows an operator to steer the vehicle 1000 by transmitting rotation of the steering wheel 1070 to movement of the steering rack 1090. The steering wheel 1070 may be, e.g., a rigid ring fixedly attached to the steering column 1080 such as is known.

With continued reference to FIG. 1, the steering actuator 1040 is coupled to the steering system 1030, e.g., the steering column 1080, so as to cause turning of the road wheels 1060. For example, the steering actuator 1040 may be an electric motor rotatably coupled to the steering column 1080, that is, coupled so as to be able to apply a steering torque to the steering column 1080. The steering actuator 1040 may be in communication with the processor 1020.

The steering actuator 1040 may provide power assist to the steering system 1030. In other words, the steering actuator 1040 may provide torque in a direction in which the steering wheel 1070 is being rotated by a human driver, allowing the driver to turn the steering wheel 1070 with less effort. The steering actuator 1040 may be an electric power-assisted steering actuator.

With reference to FIGS. 1 and 2, the brake system 2020 is typically a known vehicle braking subsystem and resists the motion of the vehicle 1000 to thereby slow and/or stop the vehicle 1000. The brake system 2020 includes brakes 1050 coupled to the road wheels 1060. The brakes 1050 may be friction brakes such as disc brakes, drum brakes, band brakes, and so on; regenerative brakes; any other suitable type of brakes; or a combination. The brakes 1050 may be coupled to, e.g., respective road wheels 1060 on opposite sides of the vehicle 1000. The brake system 2020 is in communication with and receives input from the processor 1020 and a human driver. The human driver may control the braking via, e.g., a brake pedal (not shown).

With reference to FIG. 2, the vehicle 1000 may include the sensors 2030. The sensors 2030 may detect internal states of the vehicle 1000, for example, wheel speed, wheel orientation, and engine and transmission variables. The sensors 2030 may detect the position or orientation of the vehicle 1000, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 2030 may detect the external world, for example, radar sensors, scanning laser range finders, light detection and ranging (LIDAR) devices, and image processing sensors such as cameras. The sensors 2030 may include communications devices, for example, vehicle-to-infrastructure (V2I) devices, vehicle-to-vehicle (V2V) devices, or vehicle-to-everything (V2E) devices.

The user interface 2040 presents information to and receives information from an occupant of the vehicle 1000. The user interface 2040 may be located, e.g., on an instrument panel in a passenger cabin (not shown) of the vehicle 1000, or wherever may be readily seen by the occupant. The user interface 2040 may include dials, digital readouts, screens, speakers, and so on for output, i.e., providing information to the occupant, e.g., a human-machine interface (HMI) including elements such as are known. The user interface 2040 may include buttons, knobs, keypads, touchscreens, microphones, and so on for receiving input, i.e., information, instructions, etc., from the occupant.

Figure 3:
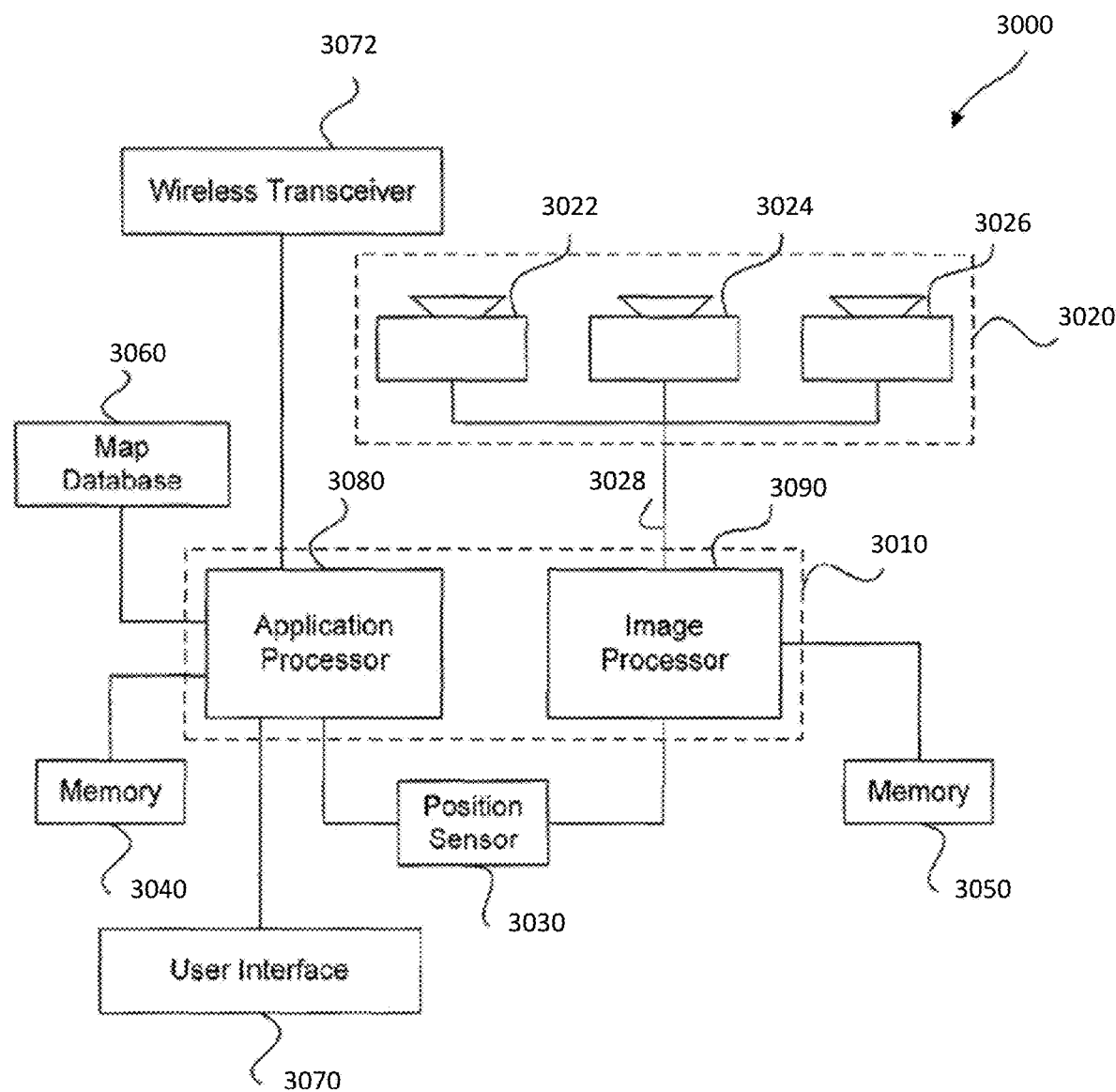
FIG. 3 is a diagram of an example of a vehicle control system in accordance with embodiments of this disclosure.

FIG. 3 is a diagram of an example of a vehicle control system 3000 in accordance with embodiments of this disclosure. Vehicle control system 3000 may include various components depending on the requirements of a particular implementation. In some embodiments, vehicle control system 3000 may include a processing unit 3010, an image acquisition unit 3020, a position sensor 3030, one or more memory units 3040, 3050, a map database 3060, a user interface 3070, and a wireless transceiver 3072. Processing unit 3010 may include one or more processing devices. In some embodiments, processing unit 3010 may include an applications processor 3080, an image processor 3090, or any other suitable processing device. Similarly, image acquisition unit 3020 may include any number of image acquisition devices and components depending on the requirements of a particular application. In some embodiments, image acquisition unit 3020 may include one or more image capture devices (e.g., cameras, CCDs, or any other type of image sensor), such as image capture device 3022, image capture device 3024, and image capture device 3026. System 3000 may also include a data interface 3028 communicatively connecting processing unit 3010 to image acquisition unit 3020. For example, data interface 3028 may include any wired and/or wireless link or links for transmitting image data acquired by image acquisition unit 3020 to processing unit 3010.

Wireless transceiver 3072 may include one or more devices configured to exchange transmissions over an air interface to one or more networks (e.g., cellular, the Internet, etc.) by use of a radio frequency, infrared frequency, magnetic field, or an electric field. Wireless transceiver 3072 may use any known standard to transmit and/or receive data (e.g., Wi-Fi, Bluetooth®, Bluetooth Smart, 802.15.4, ZigBee, etc.). Such transmissions may include communications from the host vehicle to one or more remotely located servers. Such transmissions may also include communications (one-way or two-way) between the host vehicle and one or more target vehicles in an environment of the host vehicle (e.g., to facilitate coordination of navigation of the host vehicle in view of or together with target vehicles in the environment of the host vehicle), or even a broadcast transmission to unspecified recipients in a vicinity of the transmitting vehicle.

Both applications processor 3080 and image processor 3090 may include various types of hardware-based processing devices. For example, either or both of applications processor 3080 and image processor 3090 may include a microprocessor, preprocessors (such as an image preprocessor), graphics processors, a central processing unit (CPU), support circuits, digital signal processors, integrated circuits, memory, or any other types of devices suitable for running applications and for image processing and analysis. In some embodiments, applications processor 180 and/or image processor 190 may include any type of single or multi-core processor, mobile device microcontroller, central processing unit, or the like.

In some embodiments, applications processor 3080 and/or image processor 3090 may include multiple processing units with local memory and instruction sets. Such processors may include video inputs for receiving image data from multiple image sensors and may also include video out capabilities. In one example, the processor may use 90 nm-micron technology operating at 332 Mhz.

Any of the processing devices disclosed herein may be configured to perform certain functions. Configuring a processing device, such as any of the described processors, other controllers or microprocessors, to perform certain functions may include programming of computer executable instructions and making those instructions available to the processing device for execution during operation of the processing device. In some embodiments, configuring a processing device may include programming the processing device directly with architectural instructions. In other embodiments, configuring a processing device may include storing executable instructions on a memory that is accessible to the processing device during operation. For example, the processing device may access the memory to obtain and execute the stored instructions during operation. In either case, the processing device configured to perform the sensing, image analysis, and/or navigational functions disclosed herein represents a specialized hardware-based system in control of multiple hardware based components of a host vehicle.

While FIG. 3 depicts two separate processing devices included in processing unit 3010, more or fewer processing devices may be used. For example, in some embodiments, a single processing device may be used to accomplish the tasks of applications processor 3080 and image processor

3090. In other embodiments, these tasks may be performed by more than two processing devices. Further, in some embodiments, vehicle control system 3000 may include one or more of processing unit 3010 without including other components, such as image acquisition unit 3020.

Processing unit 3010 may comprise various types of devices. For example, processing unit 3010 may include various devices, such as a controller, an image preprocessor, a central processing unit (CPU), support circuits, digital signal processors, integrated circuits, memory, or any other types of devices for image processing and analysis. The image preprocessor may include a video processor for capturing, digitizing and processing the imagery from the image sensors. The CPU may comprise any number of microcontrollers or microprocessors. The support circuits may be any number of circuits generally well known in the art, including cache, power supply, clock and input-output circuits. The memory may store software that, when executed by the processor, controls the operation of the system. The memory may include databases and image processing software. The memory may comprise any number of random access memories, read only memories, flash memories, disk drives, optical storage, tape storage, removable storage and other types of storage. In one instance, the memory may be separate from the processing unit 3010. In another instance, the memory may be integrated into the processing unit 3010.

Each memory 3040, 3050 may include software instructions that when executed by a processor (e.g., applications processor 3080 and/or image processor 3090), may control operation of various aspects of vehicle control system 3000. These memory units may include various databases and image processing software, as well as a trained system, such as a neural network, or a deep neural network, for example. The memory units may include random access memory, read only memory, flash memory, disk drives, optical storage, tape storage, removable storage and/or any other types of storage. In some embodiments, memory units 3040, 3050 may be separate from the applications processor 3080 and/or image processor 3090. In other embodiments, these memory units may be integrated into applications processor 3080 and/or image processor 3090.

Position sensor 3030 may include any type of device suitable for determining a location associated with at least one component of vehicle control system 3000. In some embodiments, position sensor 3030 may include a GPS receiver. Such receivers can determine a user position and velocity by processing signals broadcasted by global positioning system satellites. Position information from position sensor 3030 may be made available to applications processor 3080 and/or image processor 3090.

In some embodiments, vehicle control system 3000 may include components such as a speed sensor (e.g., a speedometer) for measuring a speed of vehicle 1000. Vehicle control system 3000 may also include one or more accelerometers (either single axis or multi-axis) for measuring accelerations of vehicle 1000 along one or more axes.

The memory units 3040, 3050 may include a database, or data organized in any other form, that indication a location of known landmarks. Sensory information (such as images, radar signal, depth information from lidar or stereo processing of two or more images) of the environment may be processed together with position information, such as a GPS coordinate, vehicle's ego motion, etc. to determine a current location of the vehicle relative to the known landmarks, and refine the vehicle location.

User interface 3070 may include any device suitable for providing information to or for receiving inputs from one or more users of vehicle control system 3000. In some embodiments, user interface 3070 may include user input devices, including, for example, a touchscreen, microphone, keyboard, pointer devices, track wheels, cameras, knobs, buttons, or the like. With such input devices, a user may be able to provide information inputs or commands to vehicle control system 3000 by typing instructions or information, providing voice commands, selecting menu options on a screen using buttons, pointers, or eye-tracking capabilities, or through any other suitable techniques for communicating information to vehicle control system 3000.

User interface 3070 may be equipped with one or more processing devices configured to provide and receive information to or from a user and process that information for use by, for example, applications processor 3080. In some embodiments, such processing devices may execute instructions for recognizing and tracking eye movements, receiving and interpreting voice commands, recognizing and interpreting touches and/or gestures made on a touchscreen, responding to keyboard entries or menu selections, etc. In some embodiments, user interface 3070 may include a display, speaker, tactile device, and/or any other devices for providing output information to a user.

Map database 3060 may include any type of database for storing map data useful to vehicle control system 3000. In some embodiments, map database 3060 may include data relating to the position, in a reference coordinate system, of various items, including roads, water features, geographic features, businesses, points of interest, restaurants, gas stations, etc. Map database 3060 may store not only the locations of such items, but also descriptors relating to those items, including, for example, names associated with any of the stored features. In some embodiments, map database 3060 may be physically located with other components of vehicle control system 3000. Alternatively or additionally, map database 3060 or a portion thereof may be located remotely with respect to other components of vehicle control system 3000 (e.g., processing unit 3010). In such embodiments, information from map database 3060 may be downloaded over a wired or wireless data connection to a network (e.g., over a cellular network and/or the Internet, etc.). In some cases, map database 3060 may store a sparse data model including polynomial representations of certain road features (e.g., lane markings) or target trajectories for the host vehicle. Map database 3060 may also include stored representations of various recognized landmarks that may be used to determine or update a known position of the host vehicle with respect to a target trajectory. The landmark representations may include data fields such as landmark type, landmark location, among other potential identifiers.

Image capture devices 3022, 3024, and 3026 may each include any type of device suitable for capturing at least one image from an environment. Moreover, any number of image capture devices may be used to acquire images for input to the image processor. Some embodiments may include only a single image capture device, while other embodiments may include two, three, or even four or more image capture devices. Image capture devices 3022, 3024, and 3026 will be further described with reference to FIG. 4 below.

One or more cameras (e.g., image capture devices 3022, 3024, and 3026) may be part of a sensing block included on a vehicle. Various other sensors may be included in the sensing block, and any or all of the sensors may be relied upon to develop a sensed navigational state of the vehicle.

In addition to cameras (forward, sideward, rearward, etc), other sensors such as RADAR, LIDAR, and acoustic sensors may be included in the sensing block. Additionally, the sensing block may include one or more components configured to communicate and transmit/receive information relating to the environment of the vehicle. For example, such components may include wireless transceivers (RF, etc.) that may receive from a source remotely located with respect to the host vehicle sensor based information or any other type of information relating to the environment of the host vehicle. Such information may include sensor output information, or related information, received from vehicle systems other than the host vehicle. In some embodiments, such information may include information received from a remote computing device, a centralized server, etc. Furthermore, the cameras may take on many different configurations: single camera units, multiple cameras, camera clusters, long FOV, short FOV, wide angle, fisheye, or the like.

Figure 4:
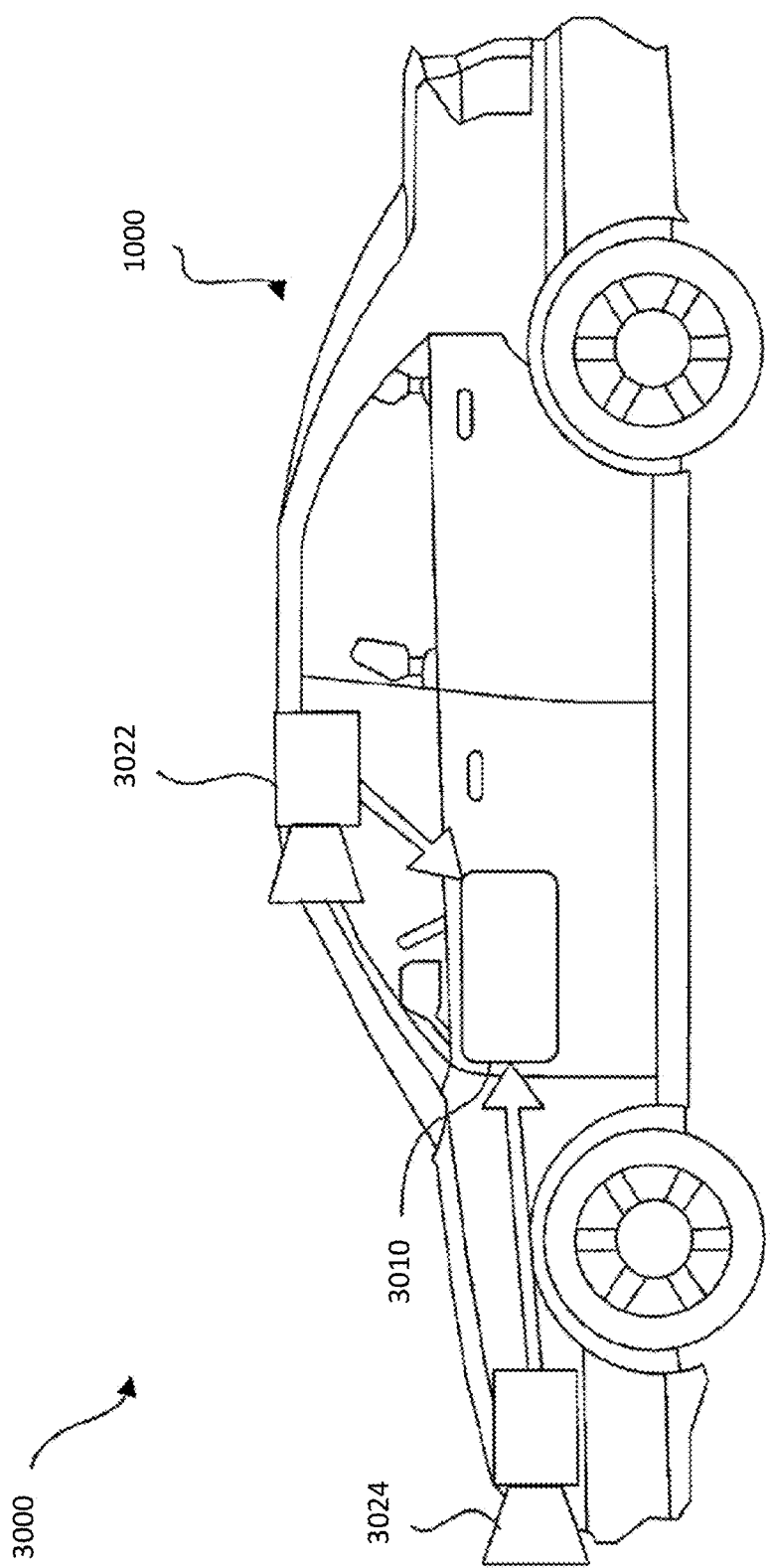
FIG. 4 is a diagram of an example of a side view of a vehicle including a vehicle control system in accordance with embodiments of this disclosure.

FIG. 4 is a diagram of an example of a side view of vehicle 1000 including a vehicle control system 3000 in accordance with embodiments of this disclosure. For example, vehicle 1000 may be equipped with a processing unit 3010 and any of the other components of vehicle control system 3000, as described above relative to FIG. 3. While in some embodiments vehicle 1000 may be equipped with only a single image capture device (e.g., camera), in other embodiments, multiple image capture devices may be used. For example, either of image capture devices 3022 and 3024 of vehicle 1000, as shown in FIG. 4, may be part of an Advanced Driver Assistance Systems (ADAS) imaging set.

The image capture devices included on vehicle 1000 as part of the image acquisition unit 3020 may be positioned at any suitable location. In some embodiments, image capture device 3022 may be located in the vicinity of the rearview mirror. This position may provide a line of sight similar to that of the driver of vehicle 1000, which may aid in determining what is and is not visible to the driver. Image capture device 3022 may be positioned at any location near the rearview mirror, but placing image capture device 3022 on the driver side of the mirror may further aid in obtaining images representative of the driver's field of view and/or line of sight.

Other locations for the image capture devices of image acquisition unit 3020 may also be used. For example, image capture device 3024 may be located on or in a bumper of vehicle 1000. Such a location may be especially suitable for image capture devices having a wide field of view. The line of sight of bumper-located image capture devices can be different from that of the driver and, therefore, the bumper image capture device and driver may not always see the same objects. The image capture devices (e.g., image capture devices 3022, 3024, and 3026) may also be located in other locations. For example, the image capture devices may be located on or in one or both of the side mirrors of vehicle 1000, on the roof of vehicle 1000, on the hood of vehicle 1000, on the trunk of vehicle 1000, on the sides of vehicle 1000, mounted on, positioned behind, or positioned in front of any of the windows of vehicle 1000, and mounted in or near light fixtures on the front and/or back of vehicle 1000.

In addition to image capture devices, vehicle 1000 may include various other components of vehicle control system 3000. For example, processing unit 3010 may be included on vehicle 1000 either integrated with or separate from an engine control unit (ECU) of the vehicle. Vehicle 1000 may also be equipped with a position sensor 3030, such as a GPS receiver and may also include a map database 3060 and memory units 3040 and 3050.

As discussed earlier, wireless transceiver 3072 may and/or receive data over one or more networks (e.g., cellular networks, the Internet, etc.). For example, wireless transceiver 3072 may upload data collected by vehicle control system 3000 to one or more servers, and download data from the one or more servers. Via wireless transceiver 3072, vehicle control system 3000 may receive, for example, periodic or on demand updates to data stored in map database 3060, memory 3040, and/or memory 3050. Similarly, wireless transceiver 3072 may upload any data (e.g., images captured by image acquisition unit 3020, data received by position sensor 3030 or other sensors, vehicle control systems, etc.) from vehicle control system 3000 and/or any data processed by processing unit 3010 to the one or more servers.

Vehicle control system 3000 may upload data to a server (e.g., to the cloud) based on a privacy level setting. For example, vehicle control system 3000 may implement privacy level settings to regulate or limit the types of data (including metadata) sent to the server that may uniquely identify a vehicle and or driver/owner of a vehicle. Such settings may be set by user via, for example, wireless transceiver 3072, be initialized by factory default settings, or by data received by wireless transceiver 3072.

Figure 5:
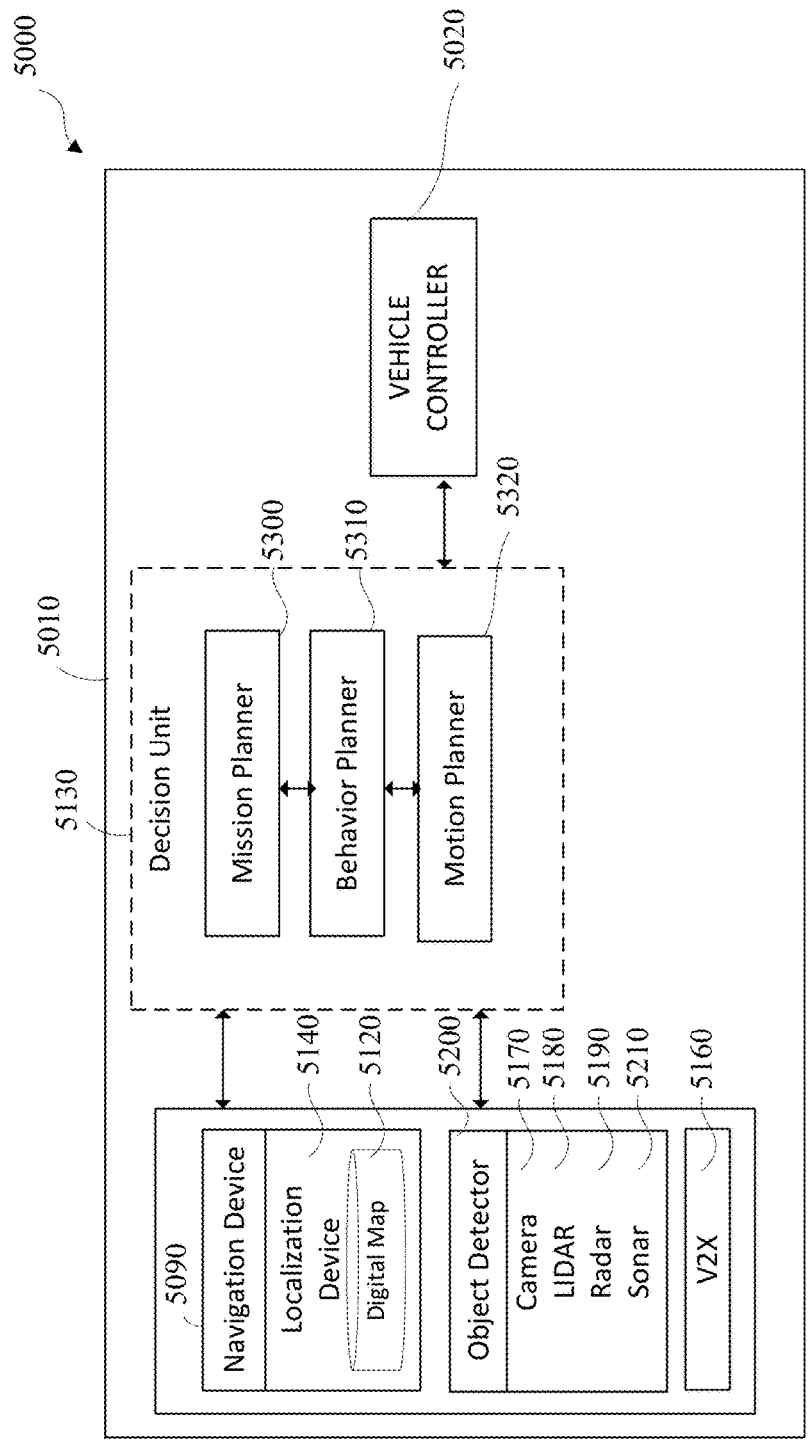
FIG. 5 is a diagram of an example of a vehicle system architecture in accordance with embodiments of this disclosure.

FIG. 5 is a diagram of an example of a vehicle system architecture 5000 in accordance with embodiments of this disclosure. The vehicle system architecture 5000 may be implemented as part of a host vehicle 5010.

Referring to FIG. 5, the vehicle system architecture 5000 includes a navigation device 5090, a decision unit 5130, object detector 5200, V2X communications 5160 and a vehicle controller 5020. The navigation device 5090 may be used by the decision unit 5130 to determine a travel path of the host vehicle 5010 to a destination. The travel path, for example, may include a travel route or a navigation path. The navigation device 5090, the decision unit 5130 and the vehicle controller 5020 may be collectively used to determine where to steer the host vehicle 5010 along a roadway such that the host vehicle 5010 is appropriately located on the roadway relative to, for example, lane markings, curbs, traffic signs, pedestrians, other vehicles, etc., determine a route based on a digital map 5120 that the host vehicle 5010 is instructed to follow to arrive at a destination, or both.

In order to determine where the host vehicle 5010 is located on the digital map 5120, the navigation device 5090 may include a localization device 5140, such as a GPS/GNSS receiver and an inertial measurement unit (IMU). A camera 5170, a radar unit 5190, a sonar unit 5210, a LIDAR unit 5180 or any combination thereof may be used to detect relatively permanent objects proximate to the host vehicle 5010 that are indicated on the digital map 5120, for example, traffic signals, buildings, etc., and determine a relative location relative to those objects in order to determine where the host vehicle 5010 is located on the digital map 5120. This process may be referred to as map localization. The functions of the navigation device 5090, the information provided by the navigation device 5090, or both, may be all or in part by way of V2I communications, V2V communications, vehicle-to-pedestrian (V2P) communications, or a combination thereof, which may generically be labeled as V2X communications 5160.

In some implementations, an object detector 5200 may include the sonar unit 5210, the camera 5170, the LIDAR unit 5180, and the radar unit 5190. The object detector 5200 may be used to detect the relative location of another entity, and determine an intersection point where another entity will intersect the travel path of the host vehicle 5010. In order to determine the intersection point and the relative timing of when the host vehicle 5010 and another entity will arrive at the intersection point, the object detector 5200 may be used by the vehicle system architecture 5000 to determine, for example, a relative speed, a separation distance of another entity from the host vehicle 5010, or both. The functions of the object detector 5200, the information provided by the object detector 5200, or both, may be all or in part by way of V2I communications, V2V communications, V2P communications, or a combination thereof, which may generically be labeled as V2X communications 5160. Accordingly, the vehicle system architecture 5000 may include a transceiver to enable such communications.

The vehicle system architecture 5000 includes a decision unit 5130 that is in communication with the object detector 5200, and the navigation device 5090. The communication may be by way of, but not limited to, wires, wireless communication, or optical fiber. The decision unit 5130 may include a processor(s) such as a microprocessor or other control circuitry such as analog circuitry, digital circuitry, or both, including an application specific integrated circuit (ASIC) for processing data. The decision unit 5130 may include a memory, including non-volatile memory, such as electrically erasable programmable read-only memory (EEPROM) for storing one or more routines, thresholds, captured data, or a combination thereof. The decision unit 5130 may include at least a mission planner 5300, behavior planner 5310 and motion planner 5320, which collectively determine or control route or path planning, local driving behavior and trajectory planning for the host vehicle 5010.

The vehicle system architecture 5000 includes a vehicle controller or trajectory tracker 5020 that is in communication with the decision unit 5130. The vehicle controller 5020 may execute a defined geometric path (which may be provided by the motion planner 5320 or the decision unit 5130) by applying appropriate vehicle commands such as steering, throttle, braking and the like motions to physical control mechanisms such as steering, accelerator, brakes, and the like that guide the vehicle along the geometric path. The vehicle controller 5020 may include a processor(s) such as a microprocessor or other control circuitry such as analog circuitry, digital circuitry, or both, including an application specific integrated circuit (ASIC) for processing data. The vehicle controller 5020 may include a memory, including non-volatile memory, such as electrically erasable programmable read-only memory (EEPROM) for storing one or more routines, thresholds, captured data, or a combination thereof.

The host vehicle 5010 may operate in automated mode where a human operator is not needed to operate the vehicle 5010. In the automated mode, the vehicle control system 5000 (using for example the vehicle controller 5020, the decision unit 5130, navigation device 5090, the object detector 5200 and the other described sensors and devices) autonomously controls the vehicle 5010. Alternatively, the host vehicle may operate in manual mode where the degree or level of automation may be little more than providing steering advice to a human operator. For example, in manual mode, the vehicle system architecture 5000 may assist the human operator as needed to arrive at a selected destination, avoid interference or collision with another entity, or both, where another entity may be another vehicle, a pedestrian, a building, a tree, an animal, or any other object that the vehicle 5010 may encounter.

The processors, control processors or controllers described herein are configured to quickly track a desired trajectory and with little tracking error. A method for motion planning is described herein that separates path planning and velocity planning and where path planning may use reference lines in combination with sampling-based motion planners to determine paths. Separation of the motion planning into path planning and velocity planning reduces the dimensionality of the search problem and results in a more efficient search for the path. Path planning may search for a collision-free path and velocity planner may generate an optimal velocity along the path taking into the motion objectives and maneuver requirements.

Figure 7:
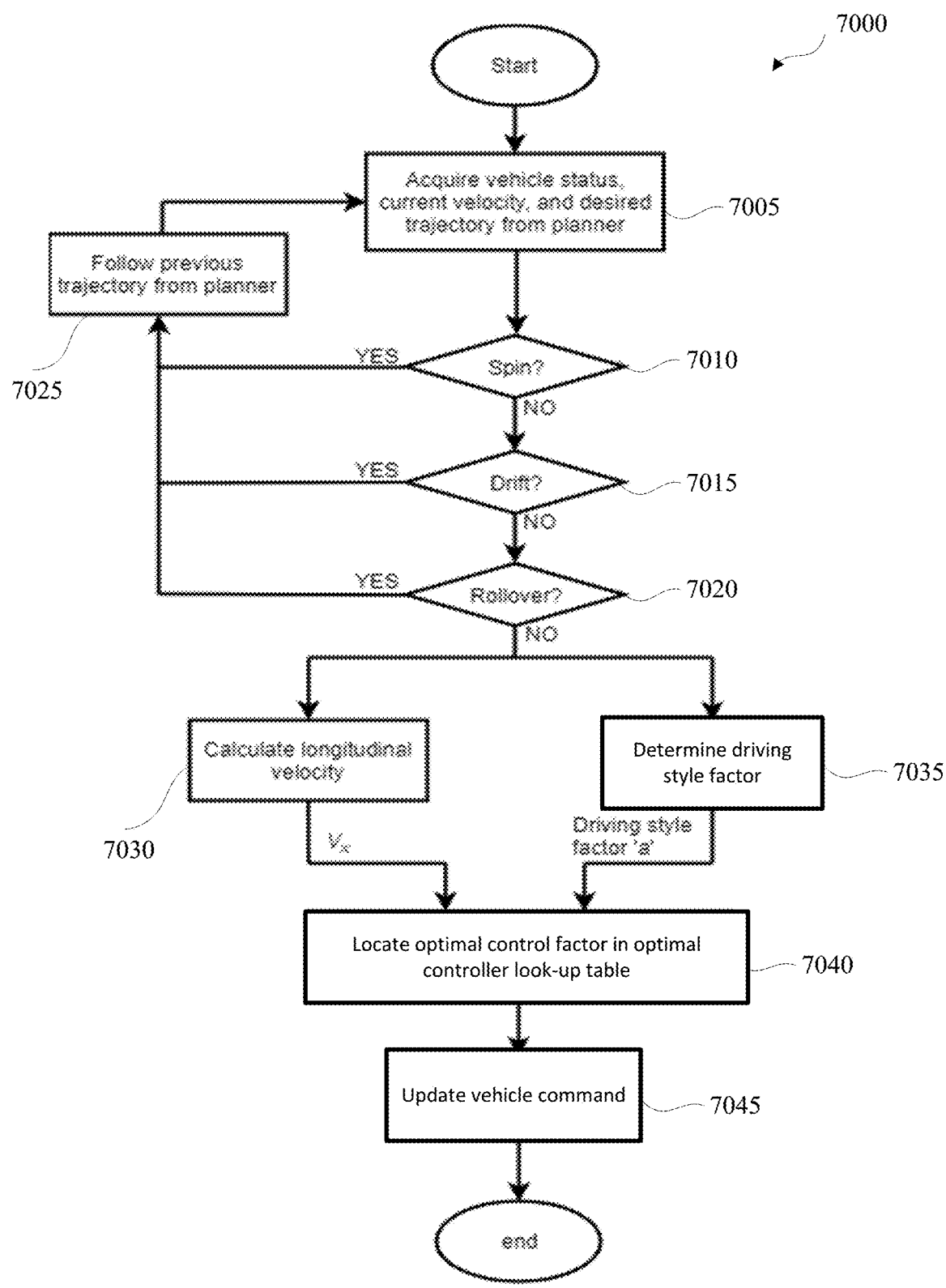
FIG. 7 is a diagram of an example of a method for optimal control using a driving style factor in accordance with embodiments of this disclosure.

FIG. 7 is a flowchart of an example technique or method 7000 for optimal control using a look-up table (LUT) in accordance with embodiments of this disclosure. The technique 7000 includes: acquiring 7005 a vehicle motion status; checking 7010, 7015, and 7020, spinning, drifting and rollover conditions; using 7025 a previous trajectory for unsafe conditions; calculating 7030 a longitudinal velocity; determining 7035 a driving style factor; locating 7040 an optimal control factor from optimal controller LUT; and updating 7045 steer angle command. The controllers described herein are configured to quickly track the desired trajectory and with little tracking error using the methods described herein. Based on the longitudinal velocity and driving style factor, an optimal control factor, such as for example the control feedback gain 'K' or its unique form of the optimal controller, is located by searching the LUT. For example, the technique 7000 may be implemented in part by the vehicle controller 5020 shown in FIG. 5, the motion planner 5320 shown in FIG. 5, the control system 1010 shown in FIG. 1, the processor 1020 shown in FIG. 1 or FIG. 2 or the processing unit 3010 shown in FIG. 3 or FIG. 4.

The technique 7000 includes acquiring 7005, by a controller or control system, a vehicle motion status, e.g. vehicle position, heading angle, steering wheel angle, velocity, direction, and the like from monitor and localization modules or units, and a desired trajectory and speed from a motion planner.

The technique 7000 includes checking 7010 spinning conditions to ensure that the desired trajectory and speed are safe. If the spinning conditions are unsafe, the technique 7000 includes using 7025 a previous trajectory from the motion planner.

The technique 7000 includes checking 7015 drifting conditions to ensure that the desired trajectory and speed are safe. If the spinning conditions are unsafe, the technique 7000 includes using 7025 a previous trajectory from the motion planner.

The technique 7000 includes checking 7020 rollover conditions to ensure that the desired trajectory and speed are safe. If the spinning conditions are unsafe, the technique 7000 includes using 7025 a previous trajectory from the motion planner.

The checking 7010, 7015, and 7020 sequence is an example and other sequences may be implemented, either in serial or parallel.

The technique 7000 includes calculating 7030 a longitudinal velocity Vx and determining 7035 a driving style factor $\alpha$ if the conditions are safe. These two parameters are used to locate an optimal control factor, such as for example an optimal feedback gain K or equation from the optimal controller LUT. In an implementation, the vehicle longitudinal velocity may be calculated from a linear velocity v and a vehicle slip angle $\beta$, where Vx=v cos $\beta$. The driving style factor $\alpha$ may be determined from information regarding vehicle status, the desired trajectory from the motion planner, current linear velocity, and the like by a driving style factor decider or unit, where the driving style factor decider or unit may be implemented in at least the vehicle controller 5020 shown in FIG. 5, or the motion planner 5320 shown in FIG. 5.

The driving style factor α may be between 0 and 1, where α=1 represents the most aggressive driving mode and α=0 represents the gentlest driving mode. The optimal controller may be configured to minimize a cost function with vehicle state x and input u, where vehicle state x may be lateral error, lateral error rate, heading angle, and heading angle rate of the vehicle, and input u is the steering angle. In an example LQR controller implementation, a cost function with driving style factor α may be defined as:

$$J = x_N^T Q x_N + \sum_{k=0}^{N-1} (x_k^T Q x_k + u_k^T R u_k)$$

where Q and R are weighing matrices for vehicle state x and input u, respectively, with the form of:

$$Q = \begin{bmatrix} \ldots(1.5\alpha + 0.5) & 0 & 0 & 0 \\ 0 & \ldots(1.5\alpha + 0.5) & 0 & 0 \\ 0 & 0 & \ldots/(1.5\alpha + 0.5) & 0 \\ 0 & 0 & 0 & \ldots/(1.5\alpha + 0.5) \end{bmatrix}$$

$$R = \cdots(1.5\alpha + 0.5)$$

Figure 8:
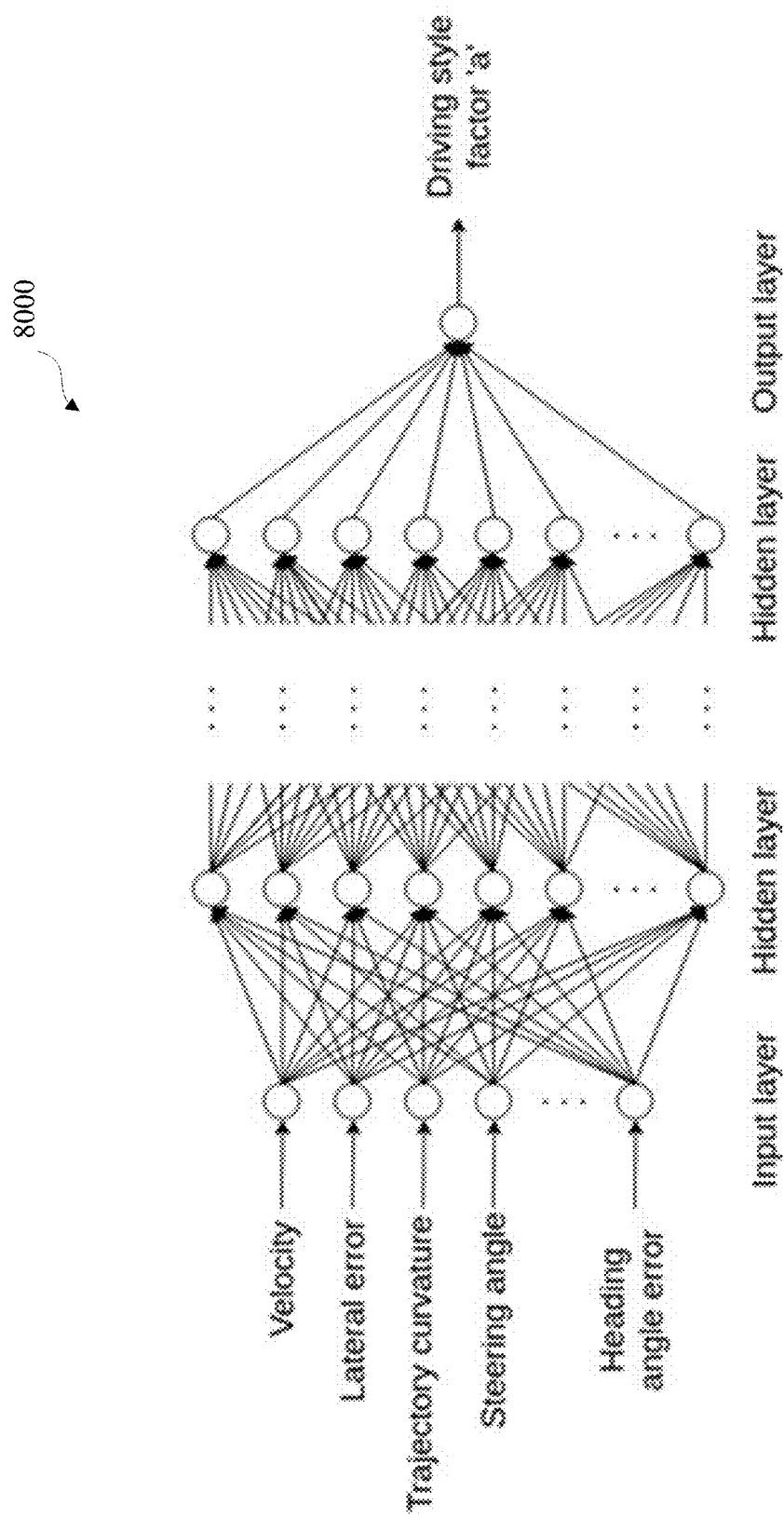
FIG. 8 is a block diagram of an example of a neural network used to determine the driving style factor in accordance with embodiments of this disclosure.

By changing the driving style factor α, the weighting matrix Q and R adjust the ratio of their weighing elements accordingly. By decreasing the driving style factor α, the weights increase with respect to the steering angle and heading angle, and the driving style becomes gentler. By increasing the driving style factor α, the weights decrease with respect to the steering angle and heading angle, and the driving style becomes more aggressive. The driving style factor decider or unit may use the information related to vehicle velocity, current steering angle, trajectory curvature, and the like to decide the driving style factor α. FIG. 8 is a block diagram of an example of a neural network 8000 used to determine the driving style factor in accordance with embodiments of this disclosure. The training of the neural network is through a series of predefined situations. In an example, an LQG controller, an MPC controller or the like may be similarly implemented.

The technique 7000 includes locating 7040 an optimal control factor from optimal controller LUT after determining the longitudinal velocity Vx and driving style factor α. The optimal control factor may be the optimal feedback gain K or its equation based on the speed. The optimal control factor may be searched or obtained from an optimal controller LUT 9000 as shown in FIG. 9, which is an example implementation of the optimal controller LUT in accordance with embodiments of this disclosure. Each element 9005 in the optimal controller LUT 9000 may be derived by solving an optimal equation offline. The use or application of the optimal controller LUT 9000 saves calculation time in determining or finding the optimal control factor. Moreover, the use of the optimal controller LUT 9000 avoids failures by the real-time controller in finding the optimal solution in the limited controller update interval.

The technique 7000 includes updating 7045 steering angle command based on the optimal control factor found in the optimal controller LUT 9000.

Figure 12:
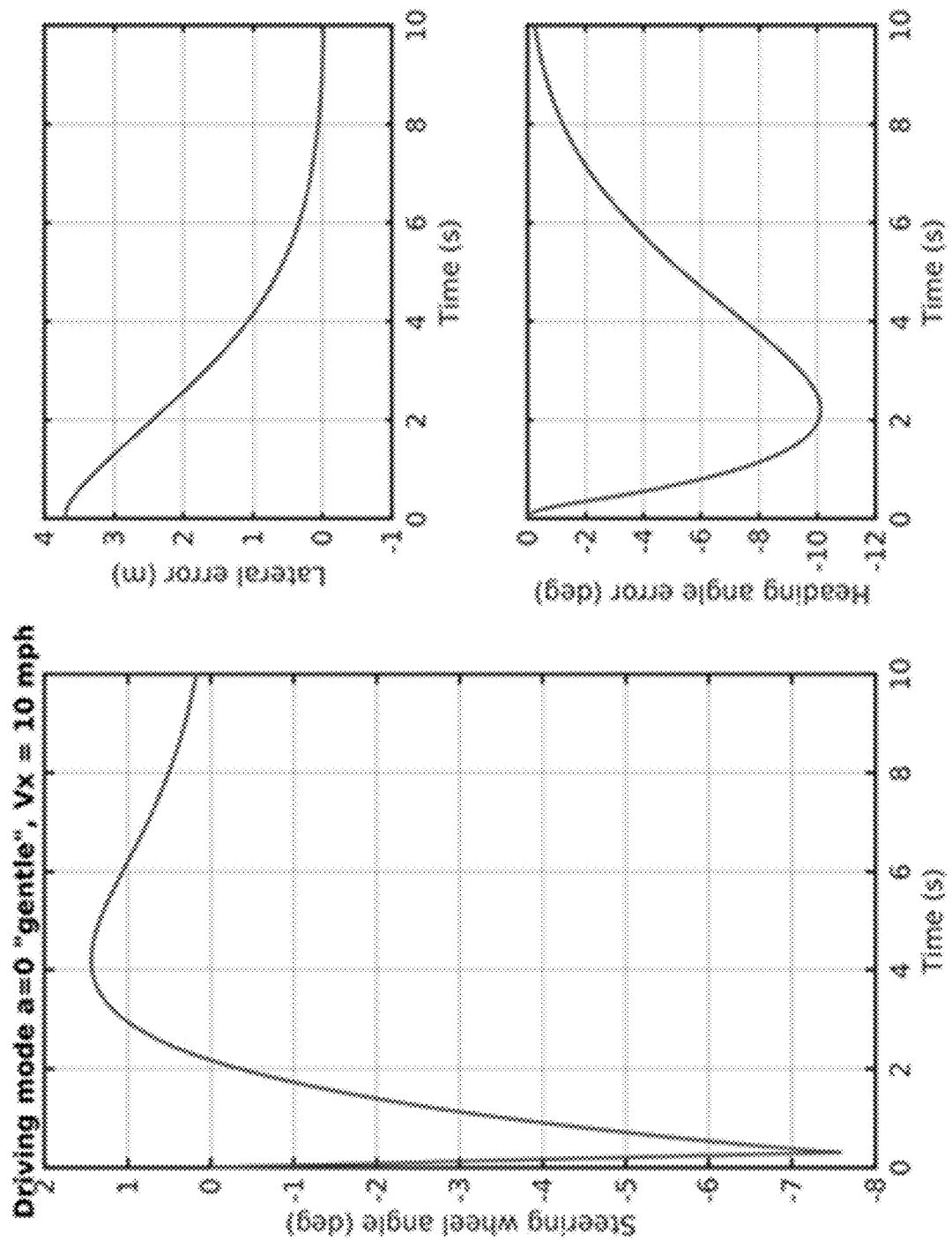
FIG. 12 are graphs of example vehicle driving parameters when a driving mode is gentle at 10 MPH in accordance with embodiments of this disclosure.
Figure 13:
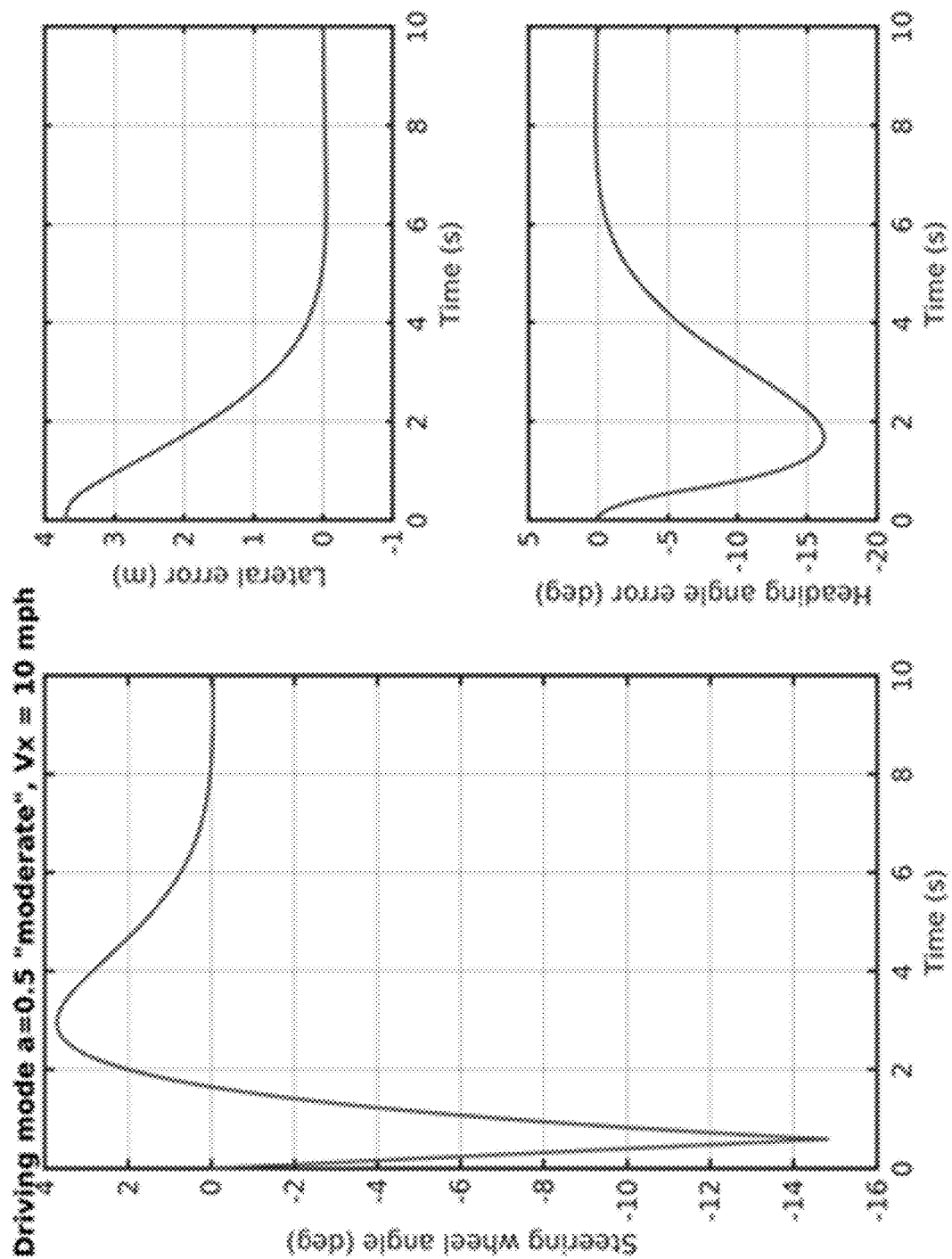
FIG. 13 are graphs of example vehicle driving parameters when a driving mode is moderate at 10 MPH in accordance with embodiments of this disclosure.
Figure 14:
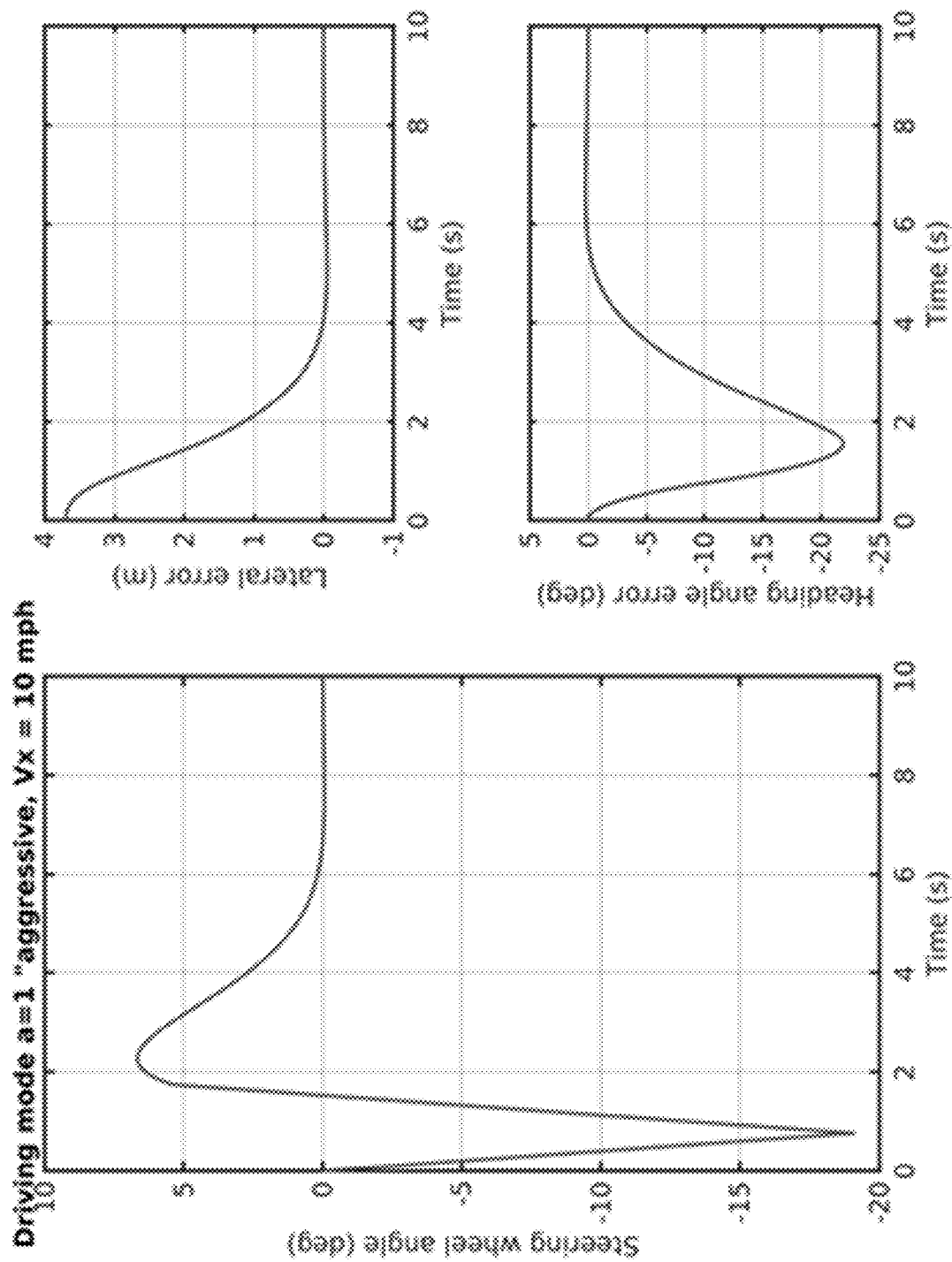
FIG. 14 are graphs of example vehicle driving parameters when a driving mode is aggressive at 10 MPH in accordance with embodiments of this disclosure.
Figure 15:
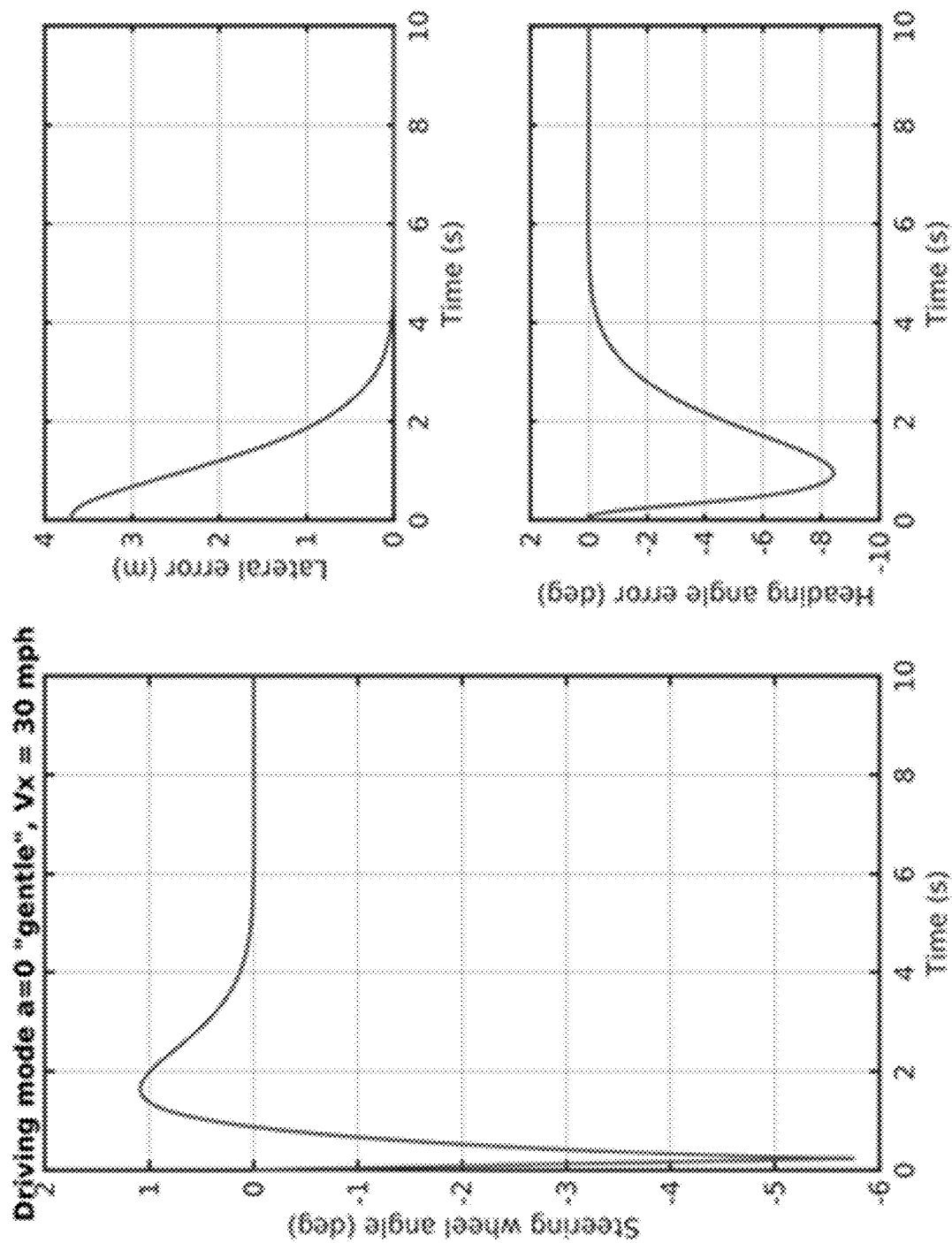
FIG. 15 are graphs of example vehicle driving parameters when a driving mode is gentle at 30 MPH in accordance with embodiments of this disclosure.
Figure 16:
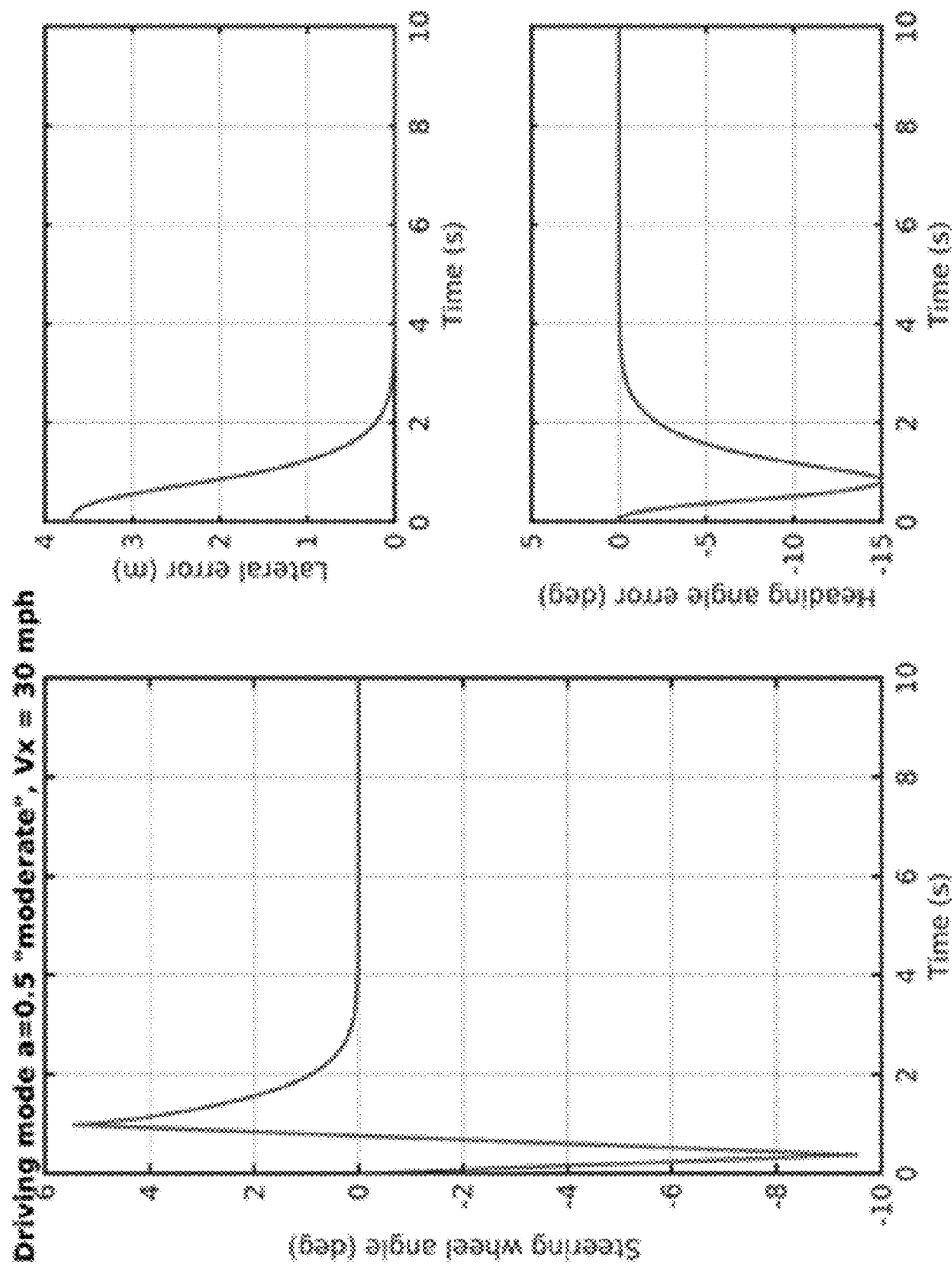
FIG. 16 are graphs of example vehicle driving parameters when a driving mode is moderate at 30 MPH in accordance with embodiments of this disclosure.
Figure 17:
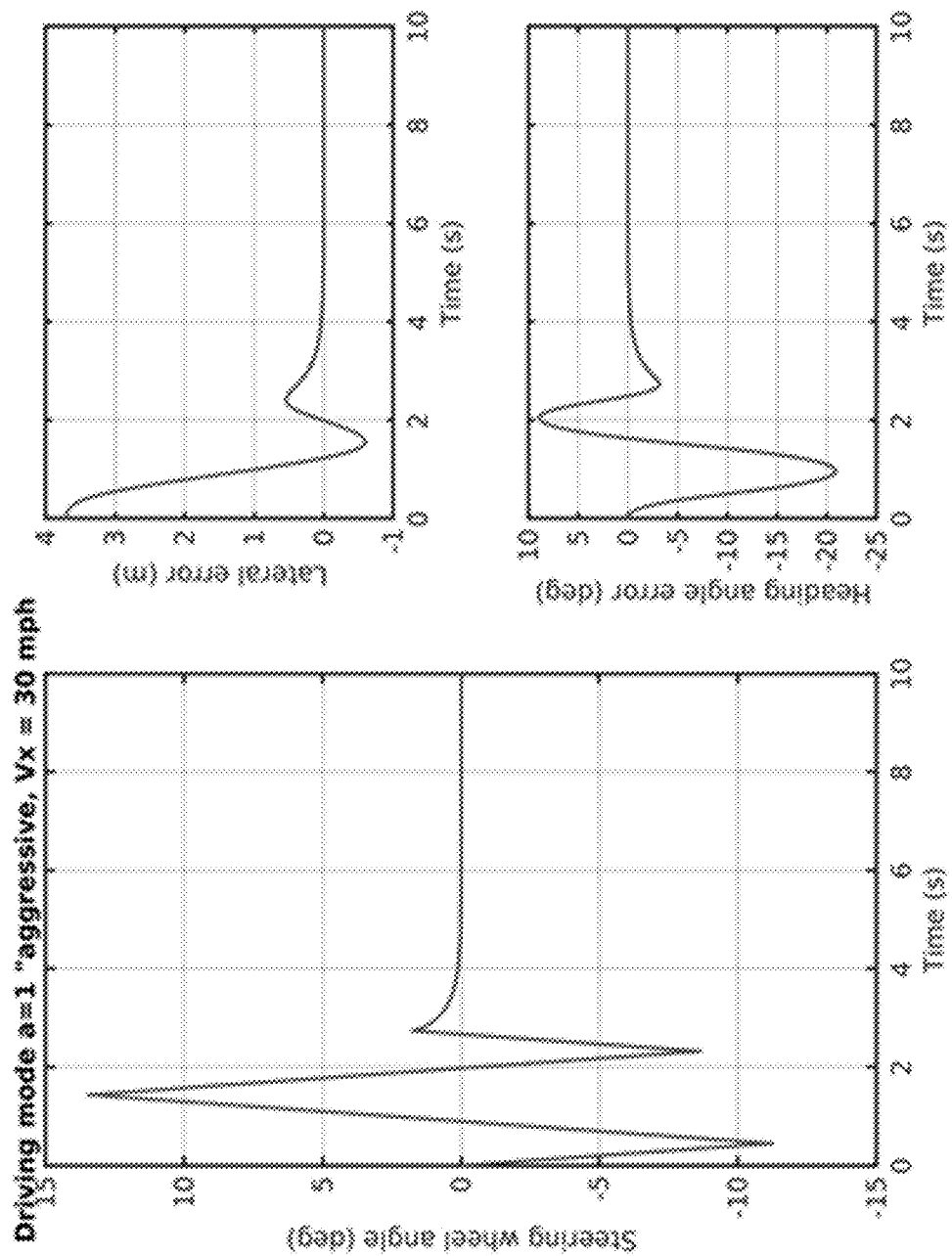
FIG. 17 are graphs of example vehicle driving parameters when a driving mode is aggressive at 30 MPH in accordance with embodiments of this disclosure.
Figure 18:
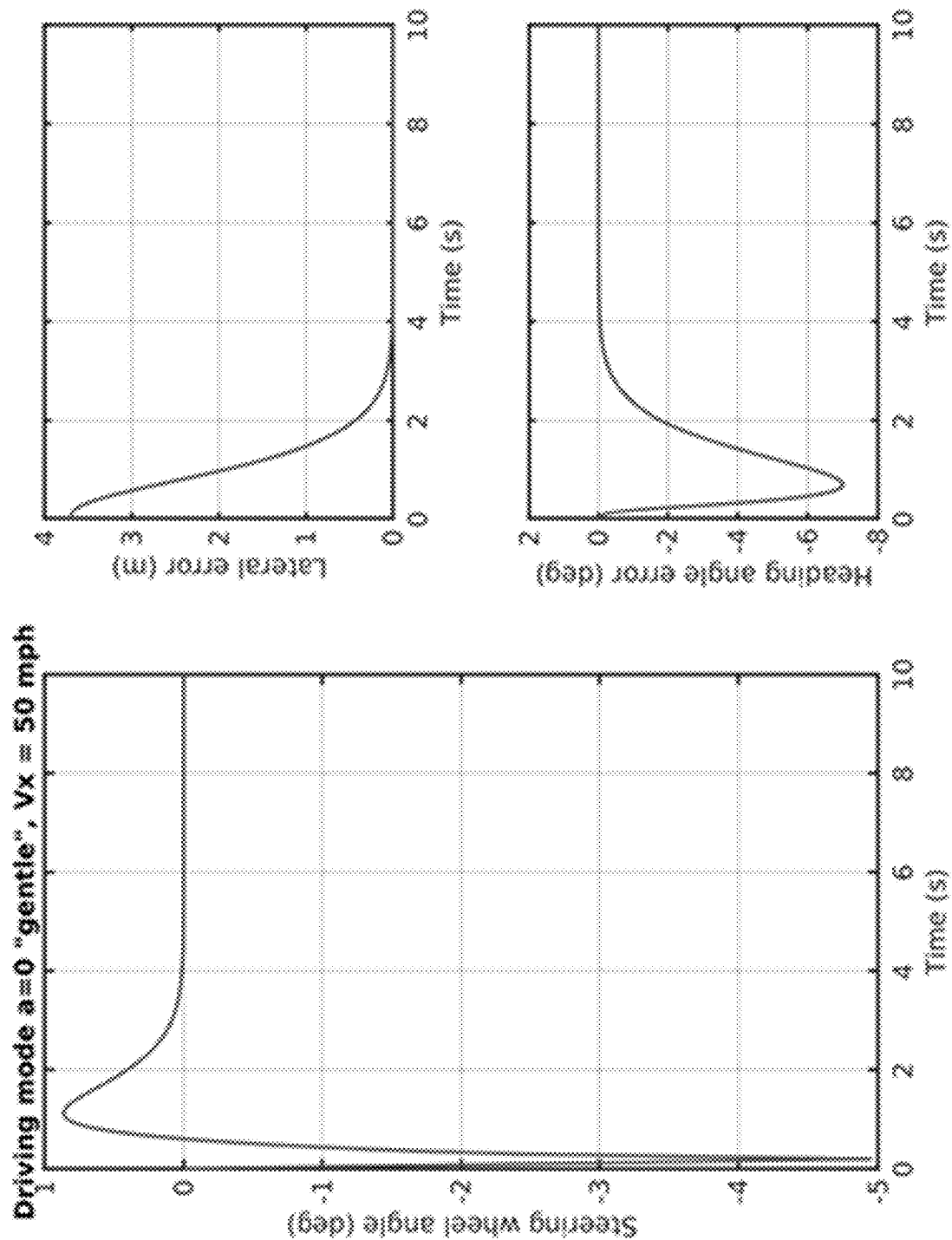
FIG. 18 are graphs of example vehicle driving parameters when a driving mode is gentle at 50 MPH in accordance with embodiments of this disclosure.
Figure 19:
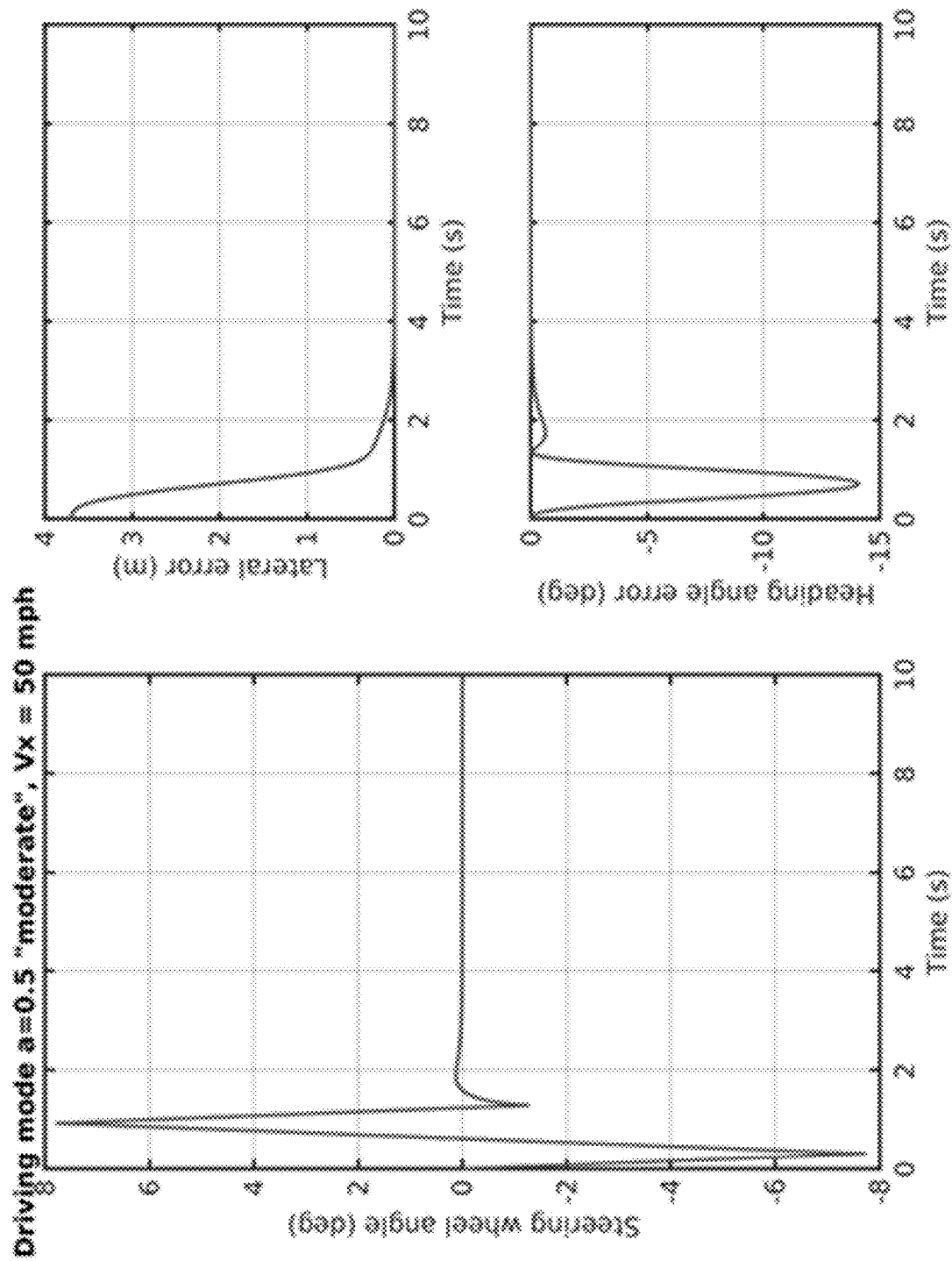
FIG. 19 are graphs of example vehicle driving parameters when a driving mode is moderate at 50 MPH in accordance with embodiments of this disclosure.
Figure 20:
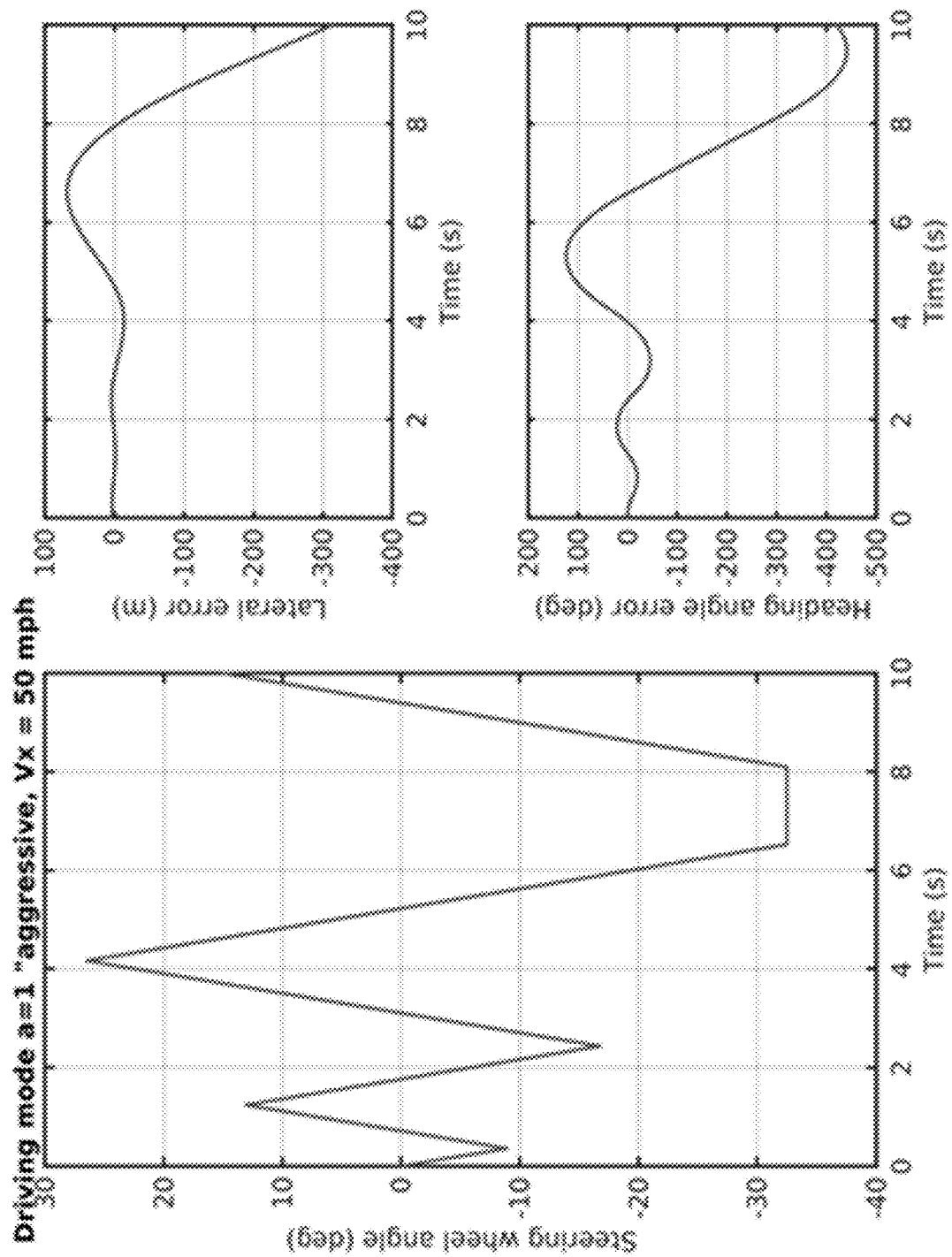
FIG. 20 are graphs of example vehicle driving parameters when a driving mode is aggressive at 50 MPH in accordance with embodiments of this disclosure.

FIG. 11 is a table of example vehicle response time and the operating range of steering wheel angle when a driving style factor α is used in accordance with embodiments of this disclosure. In this example, the scenario is a lane change on a straight road which has a 12 feet width lane, road_radius=inf and calculated at different velocities of 10, 30, 50 MPH. FIG. 12 are graphs of example vehicle driving parameters when a driving mode is gentle (a=0) at 10 MPH in accordance with embodiments of this disclosure. FIG. 13 are graphs of example vehicle driving parameters when a driving mode is moderate (a=0.5) at 10 MPH in accordance with embodiments of this disclosure. FIG. 14 are graphs of example vehicle driving parameters when a driving mode is aggressive (a=1) at 10 MPH in accordance with embodiments of this disclosure. FIG. 15 are graphs of example vehicle driving parameters when a driving mode is gentle at 30 MPH in accordance with embodiments of this disclosure. FIG. 16 are graphs of example vehicle driving parameters when a driving mode is moderate at 30 MPH in accordance with embodiments of this disclosure. FIG. 17 are graphs of example vehicle driving parameters when a driving mode is aggressive at 30 MPH in accordance with embodiments of this disclosure. FIG. 18 are graphs of example vehicle driving parameters when a driving mode is gentle at 50 MPH in accordance with embodiments of this disclosure. FIG. 19 are graphs of example vehicle driving parameters when a driving mode is moderate at 50 MPH in accordance with embodiments of this disclosure. FIG. 20 are graphs of example vehicle driving parameters when a driving mode is aggressive at 50 MPH in accordance with embodiments of this disclosure.

Figure 10:
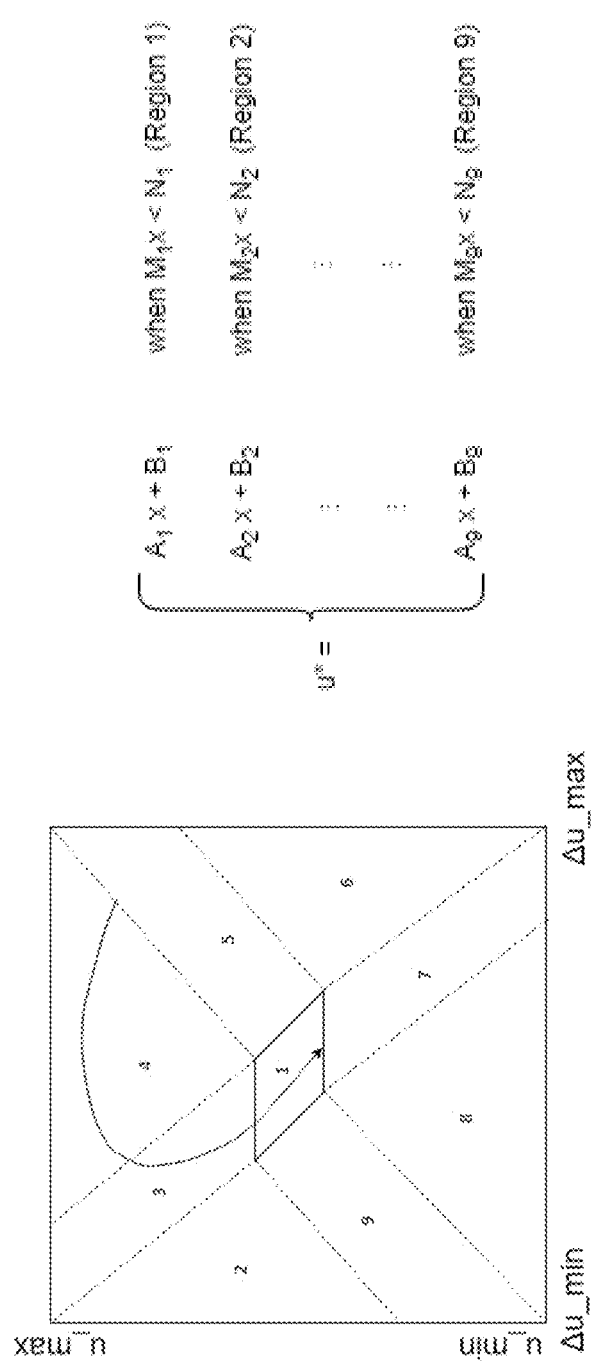
FIG. 10 is a diagram of an example of constraint regions in accordance with embodiments of this disclosure.

In an example, an MPC method and controller is used in conjunction with a driving style factor α and the optimal controller LUT. In this example, the controller may consider the influence of input and output constraints. Similar to the description above with respect to the LQR example, a whole constraint region may be divided into several subregions. Each subregion may have a unique optimal solution form. For example, FIG. 10 is a diagram of an example of constraint regions in accordance with embodiments of this disclosure. As shown, the input constraint and input rate constraint are considered. In order to solve the quadratic cost function, the entire available region may be divided into 9 regions, for example. For region 1, the optimal solution may be derived by solving an unconstrained linear function. For the other or remaining regions, the optimal solution may lead to a saturated optimal solution. Therefore, in each region, a unique optimal solution form may be obtained. By applying the optimal controller LUT, an optimal MPC solution (e.g. an optimal control factor) may be located instead of solving for the optimal solution every cycle online.

A method for controlling an autonomous vehicle (AV), the method including: acquiring vehicle status information for the AV; determining a longitudinal velocity of the AV; determining a driving style factor, wherein the driving style factor is dependent on at least road scenarios; obtaining an optimal control factor from a look-up table (LUT) using the determined longitudinal velocity and the determined driving style factor; and providing an updated control command based on the obtained optimal control factor. In an implementation, the optimal control factor is an optimal feedback gain for at least one of a linear quadratic regulator algorithm or a linear quadratic Gaussian algorithm. In an implementation, the optimal control factor is an optimal model predictive control solution for each region of a solution region. In an implementation, the vehicle status information includes at least vehicle position, heading angle, steering wheel angle, velocity, direction, desired trajectory and speed. In an implementation, the method further includes checking spinning, drifting, and rollover conditions to ensure that the desired trajectory and the speed are safe. In an implementation, the method further includes using a previous trajectory if the spinning, drifting, and rollover conditions are unsafe. In an implementation, the longitudinal velocity is determined from a linear velocity and a vehicle slip angle. In an implementation, the driving style factor is determined from at least vehicle status, desired trajectory and current linear velocity. In an implementation, the driving style factor ranges between a gentle driving mode and an aggressive driving mode. In an implementation, the method further includes the control command is at least one of a steering command, acceleration, and deceleration.

A vehicle control system for controlling an autonomous vehicle (AV). The vehicle control system including a controller, wherein the controller is configured to: acquire vehicle status information for the AV; determine a longitudinal velocity of the AV; determine a driving style factor, wherein the driving style factor is dependent on at least road scenarios; obtain an optimal control factor from a look-up table (LUT) using the determined longitudinal velocity and the determined driving style factor; and provide an updated control command based on the obtained optimal control factor. In an implementation, the optimal control factor is an optimal feedback gain for at least one of a linear quadratic regulator algorithm or a linear quadratic Gaussian algorithm. In an implementation, the optimal control factor is an optimal model predictive control solution for each region of a solution region. In an implementation, the vehicle status information includes at least vehicle position, heading angle, steering wheel angle, velocity, direction, desired trajectory and speed. In an implementation, the controller is configured to check spinning, drifting, and rollover conditions to ensure that the desired trajectory and the speed are safe. In an implementation, the controller is configured to use a previous trajectory if the spinning, drifting, and rollover conditions are unsafe. In an implementation, the longitudinal velocity is determined from a linear velocity and a vehicle slip angle. In an implementation, the driving style factor is determined from at least vehicle status, desired trajectory and current linear velocity. In an implementation, the driving style factor ranges between a gentle driving mode and an aggressive driving mode. In an implementation, the control command is at least one of a steering command, acceleration, and deceleration.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more computer readable mediums having computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for controlling an autonomous vehicle (AV), the method comprising:
   acquiring vehicle status information for the AV,
   determining a longitudinal velocity of the AV,
   determining a driving style factor based on minimizing a cost function dependent on vehicle state and steering angle when vehicle conditions are safe and is dependent on at least road scenarios;
   obtaining an optimal control factor from a look-up table (LUT) using the determined longitudinal velocity and the determined driving style factor; and
   providing an updated control command based on the obtained optimal control factor.

2. The method of claim 1, wherein the optimal control factor is an optimal feedback gain for at least one of a linear quadratic regulator algorithm or a linear quadratic Gaussian algorithm.

3. The method of claim 1, wherein the optimal control factor is an optimal model predictive control solution for each region of a solution region.

4. The method of claim 1, wherein the vehicle status information includes at least vehicle position, heading angle, steering wheel angle, velocity, direction, desired trajectory and speed and the vehicle state includes at least one of lateral error, lateral error rate, the heading angle, and heading angle rate.

5. The method of claim 1, further comprising:
   checking spinning, drifting, and rollover conditions to ensure that the vehicle conditions including the desired trajectory and the speed are safe.

6. The method of claim 5, further comprising:
   using a previous trajectory if the vehicle conditions are unsafe.

7. The method of claim 1, wherein the longitudinal velocity is determined from a linear velocity and a vehicle slip angle.

8. The method of claim 1, wherein the driving style factor is determined from at least vehicle status, desired trajectory and current linear velocity.

9. The method of claim 8, wherein the driving style factor ranges between a gentle driving mode and an aggressive driving mode.

10. The method of claim 1, wherein the control command is at least one of a steering command, acceleration, and deceleration.

11. A vehicle control system for controlling an autonomous vehicle (AV), the vehicle control system comprising:
    a controller, wherein the controller is configured to:
      acquire vehicle status information for the AV;
      determine a longitudinal velocity of the AV;
      determine a driving style factor based on minimizing a cost function dependent on vehicle state and steering angle when vehicle conditions are safe and is dependent on at least road scenarios;
      obtain an optimal control factor from a look-up table (LUT) using the determined longitudinal velocity and the determined driving style factor; and
      provide an updated control command based on the obtained optimal control factor.

12. The vehicle control system of claim 11, wherein the optimal control factor is an optimal feedback gain for at least one of a linear quadratic regulator algorithm or a linear quadratic Gaussian algorithm.

13. The vehicle control system of claim 11, wherein the optimal control factor is an optimal model predictive control solution for each region of a solution region.

14. The vehicle control system of claim 11, wherein the vehicle status information includes at least vehicle position, heading angle, steering wheel angle, velocity, direction, desired trajectory and speed and the vehicle state includes at least one of lateral error, lateral error rate, the heading angle, and heading angle rate.

15. The vehicle control system of claim 11, wherein the controller is configured to:
    check spinning, drifting, and rollover conditions to ensure that the vehicle conditions including the desired trajectory and the speed are safe.

16. The vehicle control system of claim 15, wherein the controller is configured to:
    use a previous trajectory if the vehicle conditions are unsafe.

17. The vehicle control system of claim 11, wherein the longitudinal velocity is determined from a linear velocity and a vehicle slip angle.

18. The vehicle control system of claim 11, wherein the driving style factor is determined from at least vehicle status, desired trajectory and current linear velocity.

19. The vehicle control system of claim 18, wherein the driving style factor ranges between a gentle driving mode and an aggressive driving mode.

20. The vehicle control system of claim 11, wherein the control command is at least one of a steering command, acceleration, and deceleration.

* * * * *